(12) United States Patent
Huang et al.

(10) Patent No.: US 11,016,997 B1
(45) Date of Patent: May 25, 2021

(54) GENERATING QUERY RESULTS BASED ON DOMAIN-SPECIFIC DYNAMIC WORD EMBEDDINGS

(71) Applicant: Adobe Inc., San Jose, CA (US)

(72) Inventors: Xiaolei Huang, Boulder, CO (US); Franck Dernoncourt, Sunnyvale, CA (US); Walter Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/721,124

(22) Filed: Dec. 19, 2019

(51) Int. Cl.
*G06F 16/28* (2019.01)
*G06F 16/2457* (2019.01)
*G06F 16/248* (2019.01)

(52) U.S. Cl.
CPC .......... *G06F 16/285* (2019.01); *G06F 16/248* (2019.01); *G06F 16/24578* (2019.01)

(58) Field of Classification Search
CPC .................... G06F 16/24578; G06F 16/248
See application file for complete search history.

(56) References Cited

U.S. PATENT DOCUMENTS

2009/0259669 A1* 10/2009 Abbruzzi ............ G06F 16/2462
2016/0078507 A1* 3/2016 Shivaswamy ...... G06Q 30/0605
705/26.2

OTHER PUBLICATIONS

Bojanowski, P., Grave, E., Joulin, A., and Mikolov, T. Enriching word vectors with subword information. Transactions of the Association for Computational Linguistics 5 (2017), 135-146.
Diaz, F., Mitra, B., and Craswell, N. Query expansion with locally-trained word embeddings. In Proceedings of the 54th Annual Meeting of the Association for Computational Linguistics (vol. 1: Long Papers) (Berlin, Germany, Aug. 2016), Association for Computational Linguistics, pp. 367-377.
Hamilton, W. L., Leskovec, J., and Jurafsky, D. Diachronic word embeddings reveal statistical laws of semantic change. In Proceedings of the 54th Annual Meeting of the Association for Computational Linguistics (vol. 1: Long Papers) (Berlin, Germany, Aug. 2016), Association for Computational Linguistics, pp. 1489-1501.
Huang, X., and Paul, M. J. Examining temporality in document classification. In Proceedings of the 56th Annual Meeting of the Association for Computational Linguistics (vol. 2: Short Papers) (Melbourne, Australia, Jul. 2018), Association for Computational Linguistics, pp. 694-699.

(Continued)

*Primary Examiner* — Truong V Vo
(74) *Attorney, Agent, or Firm* — Keller Jolley Preece

(57) ABSTRACT

The present disclosure relates to systems, methods, and non-transitory computer readable media for generating query results based on domain-specific dynamic word embeddings. For example, the disclosed systems can generate dynamic vector representations of words that include domain-specific embedded information. In addition, the disclosed systems can compare the dynamic vector representations with vector representations of query terms received as part of a search query. The disclosed systems can further identify one or more digital content items to provide as part of a query result that include words corresponding to the query terms based on the comparison of the vector representations. In some embodiments, the disclosed systems can also train a word embedding model to generate accurate vector representations of unique words.

20 Claims, 14 Drawing Sheets

(56) References Cited

OTHER PUBLICATIONS

Kulkarni, V., Al-Rfou, R., Perozzi, B., and Skiena, S. Statistically significant detection of linguistic change. In Proceedings of the 24th International Conference on World Wide Web (Republic and Canton of Geneva, Switzerland, 2015), WWW '15, International World Wide Web Conferences Steering Committee, pp. 625-635.

Kutuzov, A., Øvrelid, L., Szymanski, T., and Velldal, E. Diachronic word embeddings and semantic shifts: a survey. In Proceedings of the 27th International Conference on Computational Linguistics (Santa Fe, New Mexico, USA, Aug. 2018), Association for Computational Linguistics, pp. 1384-1397.

Kuzi, S., Shtok, A., and Kurland, O. Query expansion using word embeddings. In Proceedings of the 25th ACM International on Conference on Information and Knowledge Management (New York, NY, USA, 2016), CIKM '16, ACM, pp. 1929-1932.

Loper, E., and Bird, S. Nltk: The natural language toolkit. In Proceedings of the ACL-02 Workshop on Effective Tools and Methodologies for Teaching Natural Language Processing and Computational Linguistics—vol. 1 (Stroudsburg, PA, USA, 2002), ETMTNLP '02, Association for Computational Linguistics, pp. 63-70.

Mikolov, T., Sutskever, I., Chen, K., Corrado, G. S., and Dean, J. Distributed representations of words and phrases and their compositionality. In Advances in neural information processing systems (2013), pp. 3111-3119.

Rehurek, R., Andsojka, P. Software Framework for Topic Modelling with Large Corpora. In Proceedings of the LREC 2010 Workshop on New Challenges for NLP Frameworks (Valletta, Malta, May 2010), ELRA, pp. 45-50.

Tahmasebi, N., and Risse, T. The role of language evolution in digital archives. In SDA (2013), Citeseer, pp. 16-27.

Vallender, S. Calculation of the wasserstein distance between probability distributions on the line. Theory of Probability & Its Applications 18, 4 (1974), 784-786.

Willis, C., Sherman, G., and Efron, M. What makes a query temporally sensitive? In Proceedings of the Association for Information Science and Technology (2016), vol. 53, pp. 1-9.

Yao, Z., Sun, Y., Ding, W., Rao, N., and Xiong, H. Dynamic word embeddings for evolving semantic discovery. In Proceedings of the Eleventh ACM International Conference on Web Search and Data Mining (New York, NY, USA, 2018), WSDM '18, ACM, pp. 673-681.

Yuan, T. T., and Zhang, Z. Merchandise recommendation for retail events with word embedding weighted tf-idf and dynamic query expansion. In the 41st International ACM SIGIR Conference on Research & Development in Information Retrieval (New York, NY, USA, 2018), SIGIR '18, ACM, pp. 1347-1348.

Zhang, Y., Jatowt, A., and Tanaka, K. Temporal analog retrieval using transformation over dual hierarchical structures. In Proceedings of the 2017 ACM on Conference on Information and Knowledge Management (New York, NY, USA, 2017), CIKM '17, ACM, pp. 717-726.

\* cited by examiner

| time interval | 90-92 | 93-95 | 96-98 | 99-01 | 02-04 | 05-07 | 08-10 | 11-13 | 14-16 | ALL |
|---|---|---|---|---|---|---|---|---|---|---|
| #doc | 9770 | 9741 | 9975 | 12209 | 12241 | 11360 | 12240 | 12376 | 9938 | 99850 |
| #uw | 41688 | 42213 | 43017 | 48011 | 52016 | 51000 | 50522 | 53368 | 50229 | 128333 |
| #awpd | 590 | 600 | 600 | 615 | 710 | 692 | 712 | 781 | 849 | 686 |

*Fig. 6*

| Method | 10 Clusters | 15 Clusters | 20 Clusters |
|---|---|---|---|
| Static | .657 | .668 | .655 |
| Linear | .702 | .719 | .765 |
| Procrustes | .628 | .681 | .668 |
| Hierarchy | .636 | .809 | .878 |
| DW2V | .809 | .843 | .854 |
| Dynamic Word Embedding System | .810 | .916 | .905 |

*Fig. 10*

GENERATING QUERY RESULTS BASED ON DOMAIN-SPECIFIC DYNAMIC WORD EMBEDDINGS

BACKGROUND

In the field of digital information retrieval, query expansion via word embeddings is an important method for augmenting search queries and improving digital content recall. For example, some systems can find related synonyms of query words based on representing a single word as a fixed-length numerical vector to reflect its semantic meaning in a vector space. These systems can then locate vectors near the fixed-length numerical vector in the vector space to locate similar terms.

Despite these advances however, conventional word embedding systems continue to suffer from a number of disadvantages in accuracy, efficiency, and flexibility. For example, many conventional word embedding systems cannot accurately account for temporal ambiguity of a word's meaning or context over time. Thus, the embeddings generated by these conventional systems become less reliable as words change context or meaning over time. As a result, query results that these systems generate are less accurate.

In addition to their potential inaccuracy, many conventional word embedding systems are also inefficient. For example, many of these conventional systems require extensive amounts of computer resources such as memory, processing power, and computing time to train neural networks or other machine learning models. In particular, some conventional systems require first training a separate model for each context and then aligning the models by a fixed-size vocabulary. Requiring a separate aligning process is costly and can further introduce additional errors. Additionally, repetition in training becomes especially onerous as the number of word embeddings and/or context domains grow larger.

Beyond being inaccurate and inefficient, many conventional word embedding systems are also inflexible. More specifically, conventional systems are often rigidly fixed to a particular embedding domain and cannot adapt to generate word embeddings for other domains. To elaborate, the way in which many conventional word embedding systems are designed to accommodate different contexts of words prevents them from being flexibly applied to generate embeddings for other domains (e.g., locations, products, etc.). In addition, many of these conventional systems focus on word-level embeddings that prevent them from being able to identify out-of-vocabulary ("OOV") words. Indeed, because of the word-level embeddings that many conventional systems generate, these systems are limited in their adaptability to generate accurate results for OOV words that are not directly mapped into vectors.

Thus, there are several disadvantages with regard to conventional word embedding systems.

SUMMARY

One or more embodiments described herein provide benefits and solve one or more of the foregoing or other problems in the art with systems, methods, and non-transitory computer readable media that can generate domain-specific dynamic word embeddings that allow for the retrieval of semantically related terms that are domain adapted. In particular, the disclosed systems can identify digital content items that correspond to a particular domain (e.g., a time interval or a product type) indicated in a query and can provide the digital content items as a query result. To this end, the disclosed systems can analyze a repository of digital content items to determine domains associated with unique words found within the digital content items. The disclosed systems can further generate dynamic word embeddings for the unique words by concatenating a numerical representation of a respective domain to a unique word and generating a vector representation for the concatenated word-domain combination. Relating specifically to time domains, experimenters have demonstrated that the disclosed systems can improve in accuracy over conventional systems in determining word meanings for particular time intervals.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 6 illustrates a table of digital content item information in accordance with one or more embodiments;

FIG. 10 illustrates a table of improvements associated with the dynamic word embedding system in accordance with one or more embodiments;

DETAILED DESCRIPTION

Figure 1:
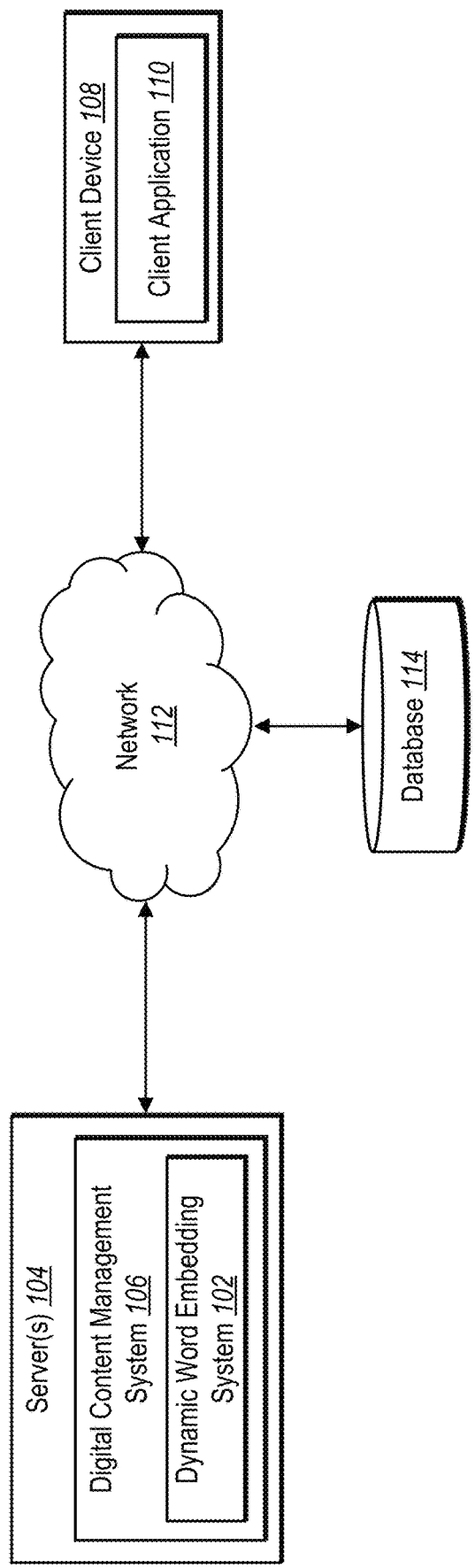
FIG. 1 illustrates an example system environment for implementing a dynamic word embedding system in accordance with one or more embodiments.

One or more embodiments described herein include a dynamic word embedding system that can generate query results based on dynamic word embeddings that include domain-specific information. Indeed, the dynamic word embedding system can generate a query result based on specific domain information that impacts the meaning of the query terms when interpreted in the given domain. More particularly, as word meanings can change based on a given domain (e.g., time intervals), the dynamic word embedding system can generate different dynamic vector representations for the same word for different domains. As a result, the dynamic word embedding system can generate query results based on domain-specific meanings of query terms.

To this end, the dynamic word embedding system can generate dynamic vector representations for words that include embedded domain information. Thus, based on receiving a query, the dynamic word embedding system can further utilize the dynamic vector representations to identify digital content items that correspond to the query (e.g., that include the same word or similar words within an indicated domain). For example, the dynamic word embedding system can receive a query from a client device along with an indication of a domain (e.g., a season or a number of years) in which to search for results. In response, the dynamic word embedding system can generate and provide a result including documents (or other digital content items) that include words whose meanings correspond to query terms in accordance with the indicated domain (e.g., time interval).

As mentioned, the dynamic word embedding system can generate dynamic vector representations for words as a basis for generating query results. To generate such dynamic vector representations of words, the dynamic word embedding system can analyze a repository of digital content items to group the digital content items into clusters based on domain information. For example, the dynamic word embedding system can group digital content items into time interval clusters, product type clusters, digital content type clusters, brand name clusters, location clusters, username clusters, etc.

In addition, the dynamic word embedding system can identify unique words that occur within (or are otherwise related to) the digital content items to group the unique words together in accordance with their corresponding digital content item clusters. For example, the dynamic word embedding system can generate groupings of unique words, where unique words within a single grouping share a domain (e.g., occur within a digital content item within the same time interval or relate to the same product). In some embodiments, the dynamic word embedding system generates the domain-specific unique word groupings such that the groupings include a collection of unique words that occur within (or are otherwise related to) digital content items of a particular domain.

As mentioned, the dynamic word embedding system can also generate dynamic vector representations of unique words such that the dynamic vector representations include domain embeddings. In particular, the dynamic word embedding system can embed domain information of unique words into vector representations of the unique words, where the domain information for a unique word corresponds to the domain of the grouping of the unique word (and, by association, the domain of the digital content item from which the unique word was identified). For example, the dynamic word embedding system can generate a dynamic vector representation for a unique word within a time interval grouping by embedding an indication of the time interval (or a time within the time interval) into the dynamic vector representation.

By generating dynamic vector representations for unique words, the dynamic word embedding system can determine and represent semantic meanings for the unique words in a vector format. In addition, the dynamic word embedding system can encode or embed the domain information into the dynamic vector representations to associate with the semantic meaning of the unique words with corresponding domains. Additional detail regarding generating dynamic vector representations of unique words is provided below with reference to the figures.

Based on generating the dynamic vector representations, the dynamic word embedding system can further generate a result for a query. In particular, the dynamic word embedding system can receive a query including one or more query terms along with an indication of domain from which to obtain a result. In response to receiving the query and the domain indication, the dynamic word embedding system can identify digital content items that correspond to the query and the domain indication. For example, the dynamic word embedding system can receive a query to search for the query term "apples" within a time interval from the year 2016 to the year 2019. To generate a result for the query, the dynamic word embedding system can model relatedness of query terms in relation to unique words based on the dynamic vector representations of the unique words.

For example, the dynamic word embedding system can determine similarity scores between the query term "apples" (and other query terms if the query includes multiple query terms) and one or more unique words. To determine similarity scores, the dynamic word embedding system can generate vector representations of the query term(s) and utilize a scoring function to measure distances between the query term(s) and the unique words in vector space. Based on the similarity scores, the dynamic word embedding system can identify one or more digital content items that relate to (e.g., that include unique words with high similarity scores) the query terms to provide as a result for the query.

In some embodiments, the dynamic word embedding system can also train one or more word embedding models to generate accurate dynamic vector representations of unique words and/or query terms. For example, in training a word embedding model, the dynamic word embedding system can utilize an objective function to maximize a probability of co-occurrence words while minimizing a probability of non-co-occurrence words.

The dynamic word embedding system can provide several advantages over conventional word embedding systems. For example, the dynamic word embedding system is more accurate than conventional systems. In particular, as opposed to conventional systems that utilize an alignment matrix, the dynamic word embedding system embeds domain-specific information directly into vector representations of unique words to more accurately generate unique domain-specific word identities even for words that have similar morphological forms. As a result, the dynamic word embedding system can more accurately determine domain-specific meanings of unique words to utilize as a basis for generating a query result that includes digital content items that are more pertinent to a received query. For example, the dynamic word embedding system can more accurately target time intervals indicated by (or together with) a query to identify digital content items that include (or otherwise relate to) unique words whose meanings align with the indicated time interval(s).

In addition, the dynamic word embedding system is more efficient than some conventional word embedding systems. For example, the dynamic word embedding system utilizes fewer computer resources such as memory, computing time, and processing power when it comes to training a word embedding model. As opposed to conventional systems that can require independent training for different time intervals (in addition to other resource-intensive training steps), the dynamic word embedding system can train a word embedding model once based on appending domain labels to unique words. In addition to more efficient training, the dynamic word embedding system further generates word embeddings on the subword or character level (and/or with lower dimensionalities) as opposed to conventional systems that require word-level embeddings, which further reduces computation and memory requirements, especially when the number of word embeddings becomes large (e.g., in the tens of thousands or more).

On top of improved accuracy and efficiency, the dynamic word embedding system is also more flexible than conventional word embedding systems. More specifically, unlike conventional systems that are limited to a single domain (e.g., the time domain), the dynamic word embedding system can flexibly adapt to generate word embeddings in a variety of personalized domains. Indeed, by generating dynamic vector representations of unique words with appended domain information, the dynamic word embedding system utilizes an adaptive word embedding technique that enables flexibility across domain types. In addition to flexibility across domains, the dynamic word embedding system is also robust to out-of-vocabulary ("OOV") words. For example, whereas conventional systems generate word-level embeddings that prevent them from determining semantic meaning of OOV words, the dynamic word embedding system can generate character-level embeddings (e.g., subword embeddings) which enables the dynamic word embedding system to determine semantic meanings of OOV words.

Further, the dynamic word embedding system can improve user privacy over conventional word embedding systems. To elaborate, many conventional systems rely on analyzing large user logs to aggregate data from which to determine relationships between words for query expansion. In many cases, however, users do not wish to share such information. To preserve the privacy of users, while also maintaining accuracy in generating query results, the dynamic word embedding system can obtain dynamic word embeddings through open digital content items and can expand a query based on domain-adapted embedding models.

As illustrated by the foregoing discussion, the present disclosure utilizes a variety of terms to describe features and benefits of the dynamic word embedding system. Additional detail is hereafter provided regarding the meaning of these terms as used in this disclosure. In particular, the term "digital content item" refers to an item of content that is observable or otherwise consumable via a computer interface. A digital content item can include (or otherwise relate to) one or more words such as readable text, spoken words, subtitles, image tags, labels, or other metadata. For example, a digital content item can include a digital document, a digital image, a digital video, a website, or a digital audio file.

As mentioned, the dynamic word embedding system can analyze digital content items to identify unique words. As used herein, the term "unique word" refers to a word that includes information that is distinct from other words. For example, a unique word can include a word with one or more different letters or characters than other words. Additionally (or alternatively), a unique word can include a word with the same characters as another word but that is associated with a different domain.

Relatedly, the term "domain" refers to a category or classification of a digital content item (and/or a unique word). In particular, a domain can indicate particular information about a digital content item (and the words that occur within or otherwise relate to the digital content item) that dictates how to classify, separate, or segment digital content items. Example domains include time intervals, demographic labels, product types, digital content types (e.g., document, image, video, etc.), brand names, locations, usernames, etc. For instance, the dynamic word embedding system can identify digital content items that share domain information such as digital documents created by the same username, or that originate from the same location (or within a threshold distance), or that reference the same brand name, or that originate from the same time interval. Along these lines, the term "domain information" refers to information that indicates a domain of a digital content item and/or a unique word.

As mentioned, the dynamic word embedding system can generate domain-specific clusters of digital content items. As used herein, the term "cluster" refers to a group, classification, or categorization of one or more digital content items. In particular, a cluster can refer to a group of digital content items that share common domain information—i.e., that are in the same domain. In some embodiments, the dynamic word embedding system separates digital content items into separate domains by grouping them into clusters based on identified domain information associated with the digital content items.

As also mentioned, the dynamic word embedding system can utilize a word embedding model to generate a dynamic vector representation of a unique word. As used herein, the term "word embedding model" refers to a machine learning model such as a neural network, a support vector machine, or another type of machine learning model that can generate dynamic vector representations of unique words based on constituent characters of the unique words as well as domain information associated with the unique words. A word embedding model can be trained and/or tuned based on inputs to determine classifications or approximate unknown functions. In particular, a word embedding model can include interconnected artificial neurons (e.g., organized in layers) that communicate and learn to approximate complex functions and generate outputs (e.g., dynamic vector representations) based on a plurality of inputs provided to the word embedding model. In some embodiments, a word embedding model can refer to an algorithm (or set of algorithms) that implements deep learning techniques to model high-level abstractions in data.

As mentioned, the dynamic word embedding system can train a word embedding model to generate dynamic vector representations of unique words. As used herein, the term "train" (or "trained" or "training") refers to utilizing information to tune or teach a neural network by, for example, adjusting one or more weights or parameters of the neural network.

As mentioned above, the dynamic word embedding system can generate a result for a query based on dynamic vector representations of unique words. As used herein, the term "query" refers to a string of one or more words or terms that prompt generating a result (e.g., within a search engine interface). A query can include one or more "query terms" that indicate a topic or subject matter that a user desires to search and which the dynamic word embedding system utilizes as the basis for obtaining a result. A query term can include one or more characters that the dynamic word embedding system analyzes to compare unique words from digital content items. Based on the comparison with the unique words, the dynamic word embedding system can generate a result that includes one or more digital content items. Relatedly, the term "result" (or "query result") refers to one or more digital content items that the dynamic word embedding system identifies as corresponding to a query. A result can include a listing of digital content items or links to digital content items.

Additional detail regarding the dynamic word embedding system will now be provided with reference to the figures. For example, FIG. 1 illustrates a schematic diagram of an example system environment for implementing a dynamic word embedding system 102 in accordance with one or more embodiments. An overview of the dynamic word embedding system 102 is described in relation to FIG. 1. Thereafter, a more detailed description of the components and processes of the dynamic word embedding system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIG. 14.

As mentioned, the environment includes a client device 108. The client device 108 can be one of a variety of computing devices, including a smartphone, a tablet, a smart television, a desktop computer, a laptop computer, a virtual reality device, an augmented reality device, or another computing device as described in relation to FIG. 14. Although FIG. 1 illustrates a single client device 108, in some embodiments the environment can include multiple different client devices, each associated with a different user. The client device 108 can communicate with the server(s) 104 via the network 112. For example, the client device 108 can receive user input from a user interacting with the client device 108 (e.g., via the client application 110) to receive a query. Thus, the dynamic word embedding system 102 on the server(s) 104 can receive information or instructions to generate a result based on the query input received by the client device 108.

As shown, the client device 108 includes a client application 110. In particular, the client application 110 may be a web application, a native application installed on the client device 108 (e.g., a mobile application, a desktop application, etc.), or a cloud-based application where all or part of the functionality is performed by the server(s) 104. The client application 110 can present or display information to a user, including a search interface displaying a query and/or a listing of one or more digital content items as part of a result. For example, the client application 110 can present a search interface including a search bar by which a user can enter a query. A user can interact with the client application 110 to provide user input in the form of a query of one or more query terms. The client application 110 can also display query results for the query within a user interface.

As illustrated in FIG. 1, the environment includes the server(s) 104. The server(s) 104 may generate, track, store, process, receive, and transmit electronic data, such as queries and query results. For example, the server(s) 104 may receive data from the client device 108 in the form of a query. In addition, the server(s) 104 can transmit data to the client device 108 to provide a result for the query. Indeed, the server(s) 104 can communicate with the client device 108 to transmit and/or receive data via the network 112. In some embodiments, the server(s) 104 comprises a distributed server where the server(s) 104 includes a number of server devices distributed across the network 112 and located in different physical locations. The server(s) 104 can comprise a content server, an application server, a communication server, a web-hosting server, or a digital content management server.

As shown in FIG. 1, the server(s) 104 can also include the dynamic word embedding system 102 as part of a digital content management system 106. The digital content management system 106 can communicate with the client device 108 to analyze a query, identify digital content items corresponding to the query, and provide the digital content items as a result for the query. In addition, the digital content management system 106 and/or the dynamic word embedding system 102 can analyze a repository of digital content items (e.g., stored within the database 114) to generate clusters of digital content items and corresponding groupings of unique words associated with particular domains. Further, the digital content management system 106 and/or the dynamic word embedding system 102 can train one or more word embedding models to generate accurate dynamic vector representations of unique words.

Although FIG. 1 depicts the dynamic word embedding system 102 located on the server(s) 104, in some embodiments, the dynamic word embedding system 102 may be implemented by (e.g., located entirely or in part) on one or more other components of the environment. For example, the dynamic word embedding system 102 may be implemented by the client device 108 and/or a third-party device.

In some embodiments, though not illustrated in FIG. 1, the environment may have a different arrangement of components and/or may have a different number or set of components altogether. For example, the client device 108 may communicate directly with the dynamic word embedding system 102, bypassing the network 112. Rather than being located external to the server(s) 104, the database 114 can also be located on the server(s) 104 and/or on the client device 108. Additionally, the environment can include one or more word embedding models as part of the dynamic word embedding system 102, stored within the database 114, included as part of the client application 110, or housed on the server(s) 104.

Figure 2:
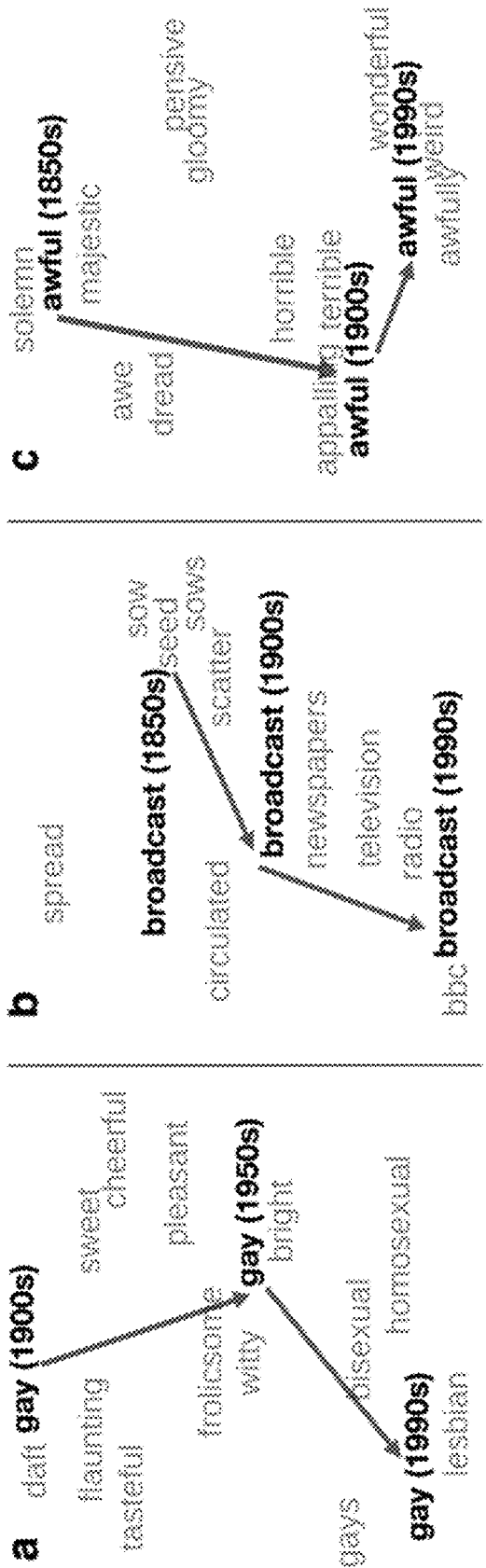
FIG. 2 illustrates shifts in word meaning over time in accordance with one or more embodiments.

As mentioned, the dynamic word embedding system 102 can generate domain-specific word embeddings. In particular, the dynamic word embedding system 102 can accommodate different changes in semantic word meaning across domains. Referring specifically to the time domain, queries are sensitive to temporality. The semantic meaning of words can change over time such as the phrase "US President" changing in meaning every four or eight years. Similarly, "adobe" can refer to the brick material or the U.S.-based technology company (since 1982). FIG. 2 illustrates how three different words have changed in semantic meaning over time in accordance with one or more embodiments. FIG. 2 is an image from Hamilton et al., Diachronic Word Embeddings Reveal Statistical Laws of Semantic Change, A C L 2016, which is hereby incorporated by reference in its entirety.

As shown in FIG. 2, in section "a," the word "gay" has changed in semantic meaning from the 1900s to the 1990s. In the 1900s, "gay" was most associated with words such as "daft" and "flaunting." As time progressed, the meaning of "gay" shifted to be more similar to "frolicsome," "witty," or "bright" in the 1950s. By the 1990s, "gay" was more closely associated with words like "homosexual" or "lesbian."

Section "b" illustrates semantic changes to the term "broadcast" over time. For example, in the 1850s, "broadcast" was closely associated with words like "sow" or "seed." As usage of the word changed over time, "broadcast" became more closely associated with words like "newspapers" by the 1900s. Still farther in the timeline, "broadcast" changed meaning to closely relate to words such as "radio" and "television."

Similarly, in section "c," FIG. 2 illustrates how the meaning of the word "awful" has changed from the 1850s to the 1990s. To elaborate, in the 1850s, "awful" was more similar to words such as "solemn" and "majestic." By the 1900s, the word "awful" was more closely associated with "appalling" and "terrible." Continuing to the 1990s, "awful" became more closely related to words such as "wonderful" and "weird."

Figure 3B:
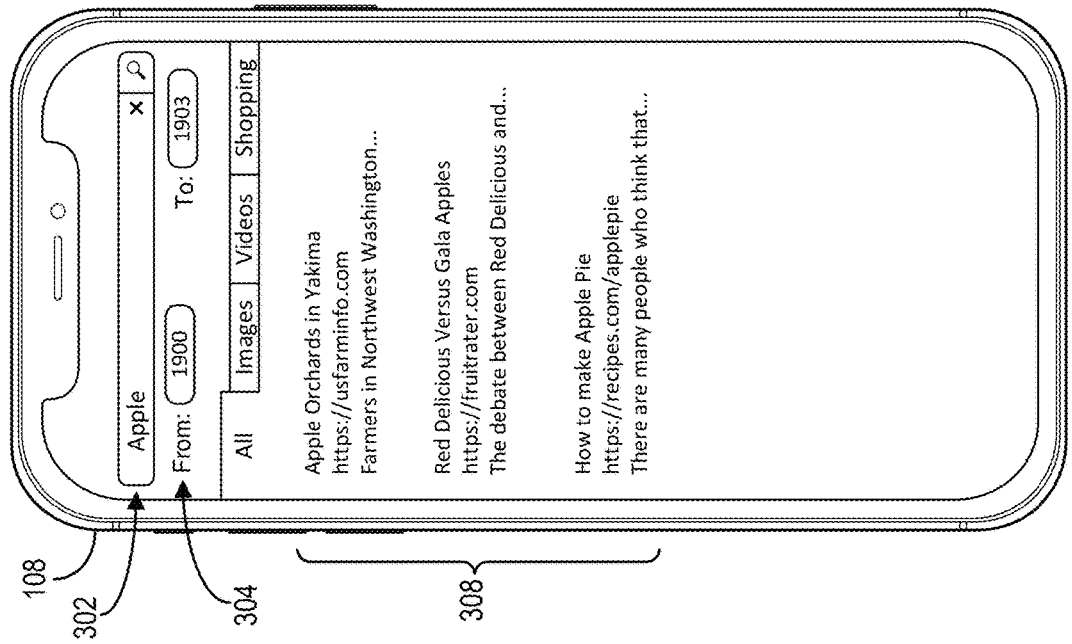
FIGS. 3A-3B illustrate different query results based on different domain indications in accordance with one or more embodiments.
Figure 3A:
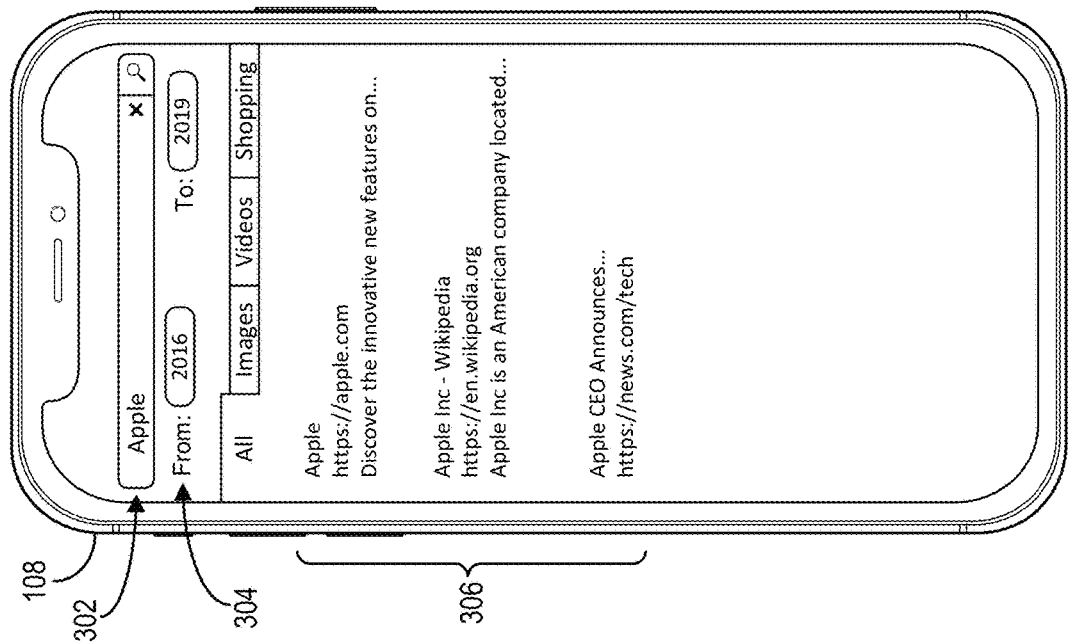

As a result of the changes in semantic word meaning over time, conventional word embedding systems struggle to generate (or are incapable of generating) accurate time-sensitive embeddings to generate actionable query results. The dynamic word embedding system 102, on the other hand, can generate accurate dynamic vector representations of words over a variety of time intervals (and other domains) to use as a basis for generating accurate query results. FIGS. 3A-3B illustrate example user interfaces of the client device 108 that present a query and corresponding results for the query. FIG. 3A illustrates query results corresponding to a time interval from 2016 to 2019, while FIG. 3B illustrates query results for the same query term for a time interval from 1900 to 1903, in accordance with one or more embodiments.

Indeed, as described above, the dynamic word embedding system 102 can receive a query from a client device (e.g., the client device 108) and can further receive an indication of a domain from which to obtain a result. FIG. 3A illustrates a search interface displayed on the client device 108 that includes a search bar for entering a query (e.g., the query 302) along with a time interval indicator 304 for setting a time interval in which to search for results. FIG. 3A also illustrates a result 306 that includes a list of links to three different digital content items that correspond to the query 302 in accordance with the time interval indicated by the time interval indicator 304.

As shown in FIG. 3A, the dynamic word embedding system 102 receives a query 302 including a single query term, "Apple." Indeed, researchers have shown that over 80% of queries in some search interfaces are single words and that the average query length is only 1.4 words. Thus, to generate good results (e.g., the result 306), the dynamic word embedding system 102 implements the query expansion described herein to identify digital content items that correspond to the query and terms related to the query.

Based on the query 302 and the time interval from 2016 to 2019, the dynamic word embedding system 102 generates the result 306. In particular, the dynamic word embedding system 102 identifies digital content items that correspond to the meaning of the query 302 within the indicated time interval. As discussed, the term "apple" can have different meanings over different time intervals. Thus, the dynamic word embedding system 102 determines similarity scores between the query term "apple" and unique words identified within (or otherwise associated with) a number of digital content items.

Based on the similarity scores, the dynamic word embedding system 102 identifies digital content items that include one or more unique words with similarity scores that satisfy a threshold to provide as the result 306. In some embodiments, the dynamic word embedding system 102 ranks and/or sorts the digital content items according to respective similarity scores. For example, the dynamic word embedding system 102 can combine (e.g., sum) similarity scores associated with unique words identified within particular digital content items and can provide digital content items with higher cumulative similarity scores higher in the list for the result 306.

As illustrated in FIG. 3A, the result 306 includes digital content items that relate to the technology company, "APPLE." Indeed, the list of digital content items indicates an APPLE website in addition to a Wikipedia page for APPLE and a news article related to an announcement made by the APPLE CEO. As shown, the top three digital content items that are displayed as part of the result 306 relate to APPLE the company rather than the fruit. Indeed, due to the time interval from 2016 to 2019, the semantic meaning of "apple" more closely related to the technology company than the fruit.

As mentioned above, the dynamic word embedding system 102 can generate different results for the same query over a different time interval. Indeed, word meanings change over time, and the dynamic word embedding system 102 can identify digital content items that correspond to a word's meaning in a specific time interval. As shown in FIG. 3B, the dynamic word embedding system 102 receives the same query 302 with the same query term, "apple." However, in FIG. 3B, the dynamic word embedding system 102 receives a different time interval (from the year 1900 to 1903), as indicated by the time interval indicator 304.

Based on the query 302 and the time interval from 1900 to 1903, the dynamic word embedding system 102 generates and provides the result 308 that includes links to three digital content items. In contrast to the result 306 of FIG. 3A, the result 308 of FIG. 3B includes digital content items that relate to the meaning of the word "apple" from the time interval of 1900 to 1903. As shown, the digital content items included in the result 308 relate to the apple the fruit and not APPLE the technology company. For example, the result 308 includes a digital content item related to apple orchards in Yakima, Wash., another digital content item related to a comparison of red delicious apples with gala apples, and a third digital content item on instructions for making apple pie. Indeed, to generate the result 308, the dynamic word embedding system 102 determines time-interval-specific meanings of words by generating dynamic vector representations that include domain (e.g., time interval) information, which results in the differences in identified digital content items between FIG. 3A and FIG. 3B. Additional detail regarding generating the dynamic vector representations is provided below with reference to subsequent figures.

As mentioned above, the dynamic word embedding system 102 can generate results for domains other than time intervals. More particularly, the dynamic word embedding system 102 can receive an indication of a domain such as a particular product type, a brand name, a location, a username, or some other domain. For example, the dynamic word embedding system 102 can receive an indication to search for tennis shoes. In response, the dynamic word embedding system 102 can generate and provide results of digital content items corresponding to the query "tennis shoes" based on dynamic vector representations. In some embodiments, the dynamic word embedding system 102 need not receive an indication of a domain but may instead ascertain a domain automatically based on query terms. For example, rather than receiving a time interval via the time interval indicator 304, the dynamic word embedding system 102 can receive query terms that indicate the time interval such as "from 2016 to 2019" or "from 1900 to 1903."

Additionally, the dynamic word embedding system 102 can receive a domain indication that indicates multiple domains rather than only a single domain. For example, the dynamic word embedding system 102 can receive a domain indication that indicates a first time interval of 2000 to 2003 and a second time interval from 2012 to 2015. Based on receiving two domains (e.g., two time intervals), the dynamic word embedding system 102 can generate a result that includes digital content items corresponding to both domains. For example, the dynamic word embedding system 102 can identify digital content items corresponding to query term meanings from 2000 to 2003 and also different meanings for the same query terms from 2012 to 2015.

Figure 4:
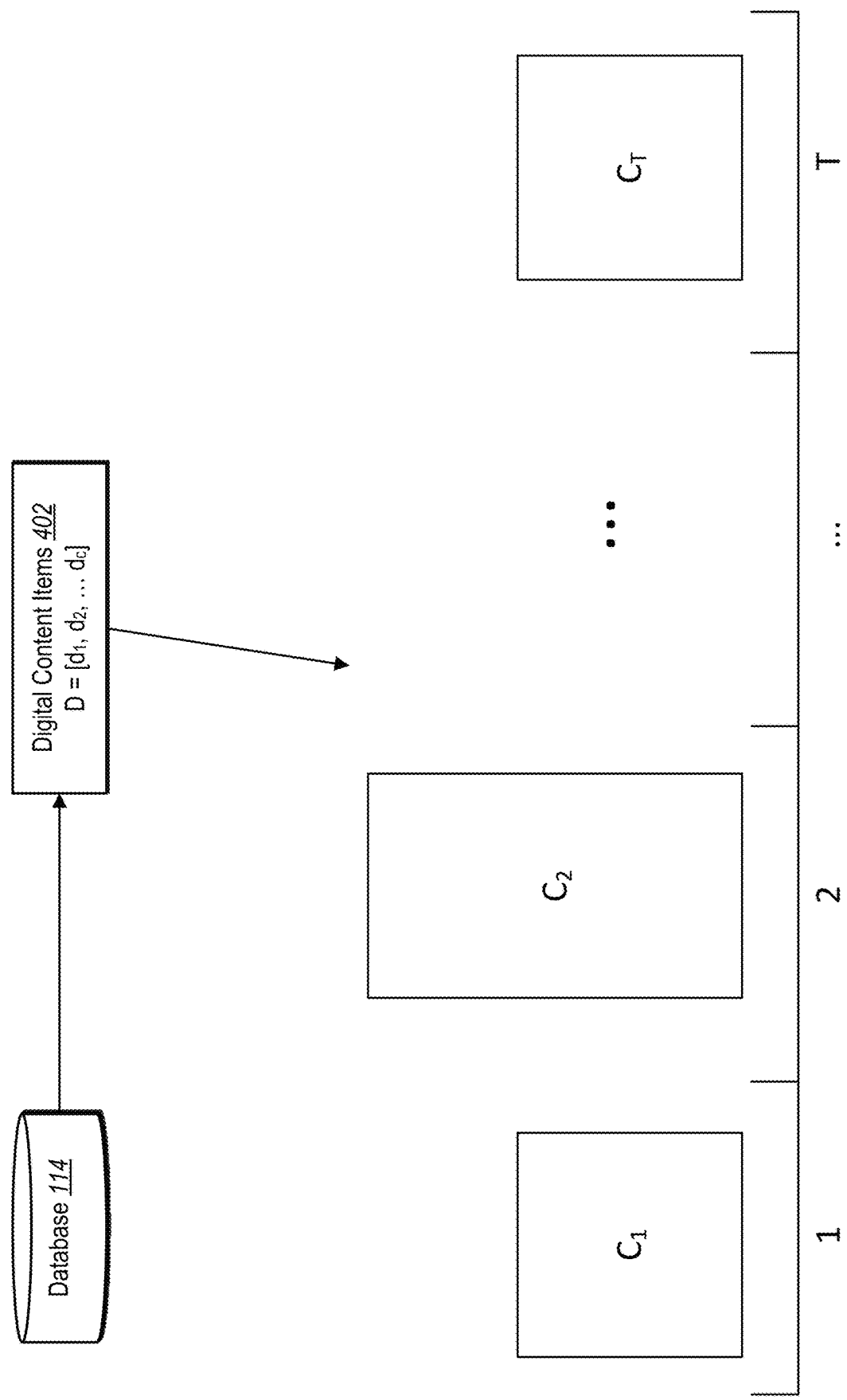
FIG. 4 illustrates an overview of generating domain clusters of digital content items in accordance with one or more embodiments.

As mentioned, the dynamic word embedding system 102 can generate dynamic vector representations of unique words to use as a basis for identifying digital content items that correspond to a query. In particular, the dynamic word embedding system 102 can generate dynamic vector representations that include embedded domain information such as time interval information. To generate dynamic vector representations of unique words, the dynamic word embedding system 102 analyzes a repository of digital content items to group the digital content items into domain-specific clusters. In some embodiments, the dynamic word embedding system 102 generates dynamic word embeddings based on given domain information, and the dynamic word embedding system 102 therefore identifies already-assigned domain labels. FIG. 4 illustrates generating clusters of digital content items by analyzing digital content items stored within the database 114, in accordance with one or more embodiments. Additionally, the description of FIG. 4, along with the description of FIGS. 5-7 (including the specific algorithms) can provide structure for performing a step for generating a dynamic vector representation of a unique word occurring within the plurality of digital content items, the dynamic vector representation indicating a domain associated with the unique word based on the domain information of the plurality of digital content items.

As illustrated in FIG. 4, the dynamic word embedding system 102 accesses digital content items 402 (e.g., D=[$d_1$, $d_2$, ..., $d_c$]) from the database 114, where c represents the total number of digital content items 402 in the repository collection. In addition, the dynamic word embedding system 102 analyzes domain information associated with the individual digital content items 402. For example, the dynamic word embedding system 102 determines a creation time or a time of origin for each of the digital content items $d_1$, $d_2$, ..., $d_c$. As another example, the dynamic word embedding system 102 determines a location or a username associated with each of the digital content items $d_1$, $d_2$, ..., $d_c$.

As further illustrated in FIG. 4, the dynamic word embedding system 102 generates bins or clusters of digital content items 402 based on their respective domain information. In particular, the dynamic word embedding system 102 groups the digital content items D=[$d_1$, $d_2$, ..., $d_c$] into clusters C=[$C_1$, $C_2$, ..., $C_T$] by identifying digital content items 402 that share domain information and grouping them in common clusters. For example, the dynamic word embedding system 102 clusters the digital content items 402 into separate time intervals based on identifying respective times of origin of the digital content items 402. In some embodiments, the dynamic word embedding system 102 generates the clusters such that each time interval cluster of digital content items 402 is given by $C_t$ for $t \in T$.

Indeed, FIG. 4 illustrates clusters $C_1$, $C_2$, ..., $C_T$, where the relative size of the clusters reflects approximate numbers of digital content items 402 within the clusters. For example, the dynamic word embedding system 102 generates the digital content item cluster $C_1$ with fewer digital content items 402 than the cluster $C_T$ which, in turn, has fewer digital content items 402 than the cluster $C_2$. Referring to the time domain, the dynamic word embedding system 102 generates the clusters $C_1$, $C_2$, ..., $C_T$ to include digital content items 402 whose times of origin fall within respective time intervals. For example, the dynamic word embedding system 102 can utilize a time interval of four years to separate the clusters so that digital content items 402 that originated from 2010 to 2013 may belong to one cluster while digital content items 402 that originated from 2013 to 2016 may belong to another cluster. For other domains, the dynamic word embedding system 102 can generate domain-specific clusters of digital content items 402 according to locations, product types, brand names, etc.

Upon grouping the digital content items 402 into domain clusters, the dynamic word embedding system 102 further generates groups of unique words that occur within the respective clusters. In particular, the dynamic word embedding system 102 analyzes the digital content items D=[$d_1$, $d_2$, ..., $d_c$] from the database 114 to identify unique words that occur within the digital content items. For the set of digital content items D=[$d_1$, $d_2$, ..., $d_c$], the dynamic word embedding system 102 can represent each of the digital content items $d_1$, $d_2$, ..., de as a collection of words d=[$w_1$, $w_2$, ..., $w_n$], where n represents the total number of words in (or otherwise associated with) each digital content item. For instance, n can represent the number of words in a digital document or a number of words in a transcript of a digital video or a digital audio file.

Figure 5:
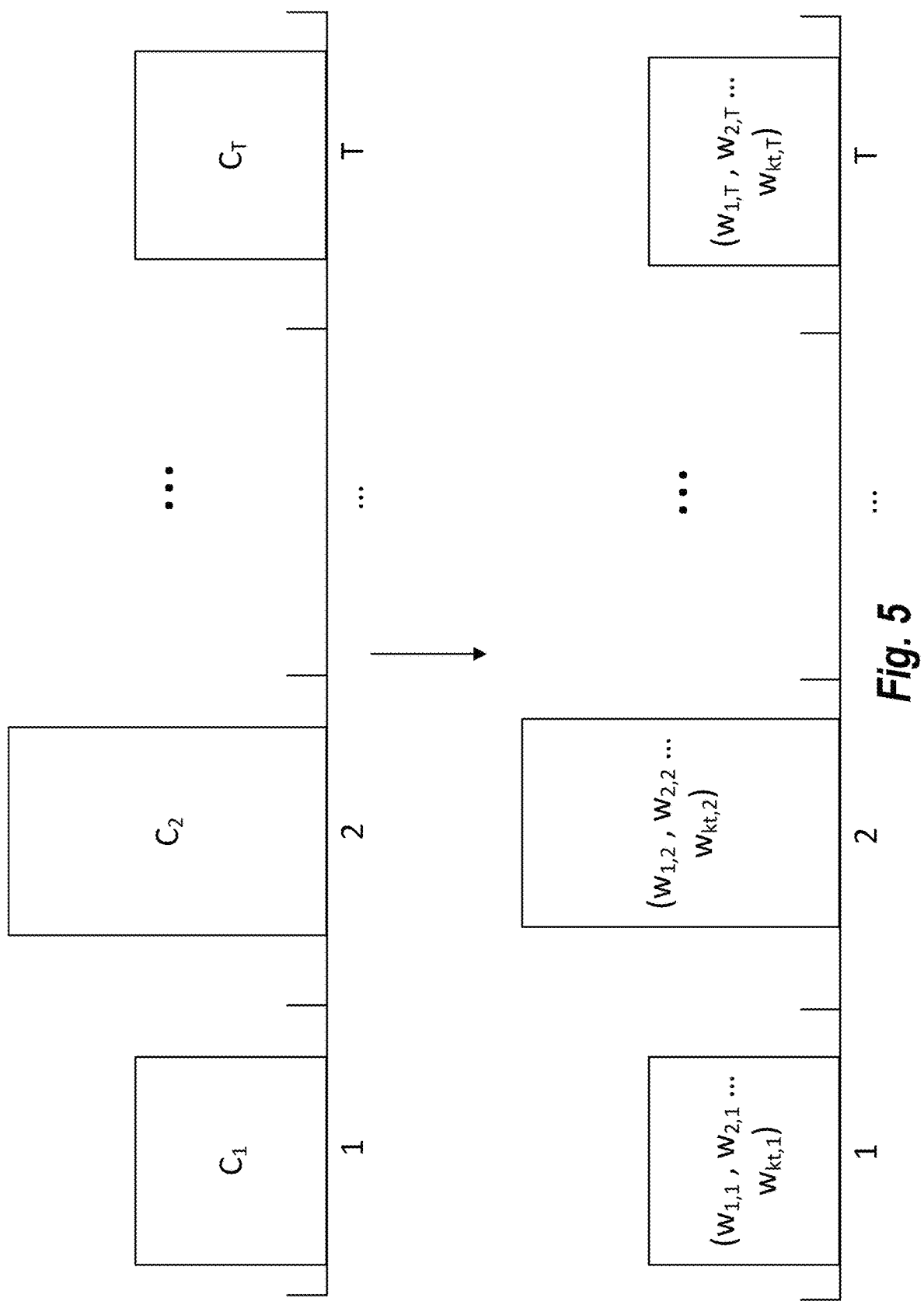
FIG. 5 illustrates an overview of generating groups of unique words based on domain clusters in accordance with one or more embodiments.

Further, the dynamic word embedding system 102 can generate a set of unique words for the digital content items D=[$d_1$, $d_2$, ..., $d_c$], as given by V=[$w_1$, $w_2$, ..., $w_k$], where k is the total number of unique words and V is the set of unique words across the digital content items D. Based on identifying the unique words, the dynamic word embedding system 102 can further generate groups of unique words corresponding to the clusters of digital content items. FIG. 5 illustrates generating domain-specific groups of unique words based on the clusters of digital content items, in accordance with one or more embodiments.

As shown, the dynamic word embedding system 102 can model the domain aspect of unique words as $w_{i,t} \in [(w_{1,1}, w_{2,1}, ..., w_{kt,1}), (w_{1,2}, w_{2,1}, ..., w_{kt,2}), ..., (w_{1,T}, w_{2,T}, ..., w_{kt,T})]$, where i represents an index of a unique word, t represents a domain (e.g., a time interval), and kt represents the number of unique words within the domain cluster. Indeed, the dynamic word embedding system 102 can determine unique words that occur within respective clusters of digital content items, thereby generating a vocabulary for each domain. Based on determining the unique words within the domain clusters, the dynamic word embedding system 102 can further generate domain groups of the unique words to use as a basis for generating dynamic vector representations of the unique words.

As illustrated in FIG. 5, the dynamic word embedding system 102 generates the first group of unique words corresponding to (e.g., that occur within) the first domain (e.g., the first time interval), as given by $(w_{1,1}, w_{2,1}, \ldots, w_{kt,1})$, where $w_{1,1}$ is the first unique word within the first domain and $w_{kt,1}$ is the last unique word in the first domain. In addition, the dynamic word embedding system 102 generates the second group of unique words corresponding to the second domain (e.g., the second time interval), as shown by $(w_{1,2}, w_{2,2}, \ldots, w_{kt,2})$, where $w_{1,2}$ is the first unique word within the second domain and $w_{kt,2}$ is the last unique word in the second domain. Similarly, the dynamic word embedding system 102 generates a final group of unique words that occur within the domain T, as shown by $(w_{1,T}, w_{2,T}, \ldots, w_{kt,T})$, where $w_{1,T}$ is the first unique word within the T domain and $w_{kt,T}$ is the last unique word in the T domain.

As mentioned, the dynamic word embedding system 102 can generate clusters of digital content items and corresponding groups of unique words corresponding to respective domains. FIG. 6 illustrates an example table of data that the dynamic word embedding system 102 can utilize to sort digital content items into time interval clusters and to group unique words into corresponding time interval groups, in accordance with one or more embodiments. As shown, the dynamic word embedding system 102 utilizes a dataset containing 99,872 newspaper articles from the New York Times over 27 years ranging from 1990 to 2016. The dynamic word embedding system 102 can tokenize the digital documents that contain only letters and numbers. In some embodiments, the dynamic word embedding system 102 utilizes a tokenizing technique described by E. Loper and S. Bird in *The Natural Language Toolkit*, Proceedings of the ACL-02 Workshop on Effective Tools and Methodologies for Teaching Natural Language Processing and Computational Linguistics, vol. 1 63-70 (2002), which is incorporated herein by reference in its entirety. The dynamic word embedding system 102 can also drop any paragraphs that are smaller than a threshold number of tokens (e.g., 5 tokens).

As shown, the dynamic word embedding system 102 analyzes the digital documents to generate time interval clusters where, for example, the years 1990-1992 include 9,770 digital documents with 41,688 unique words and an average number of words per document of 590 words. In addition, the time interval of 1993 to 1995 includes 9741 digital documents, 42,213 unique words, and an average of 600 words per document. To generate or organize the data of the table in FIG. 6, the dynamic word embedding system 102 utilizes the processes and methods described above in relation to FIGS. 4-5. Based on the tabulated data in FIG. 6 (or some other domain-specific organization of unique words and digital content items), the dynamic word embedding system 102 can further generate dynamic vector representations of unique words.

Figure 7:
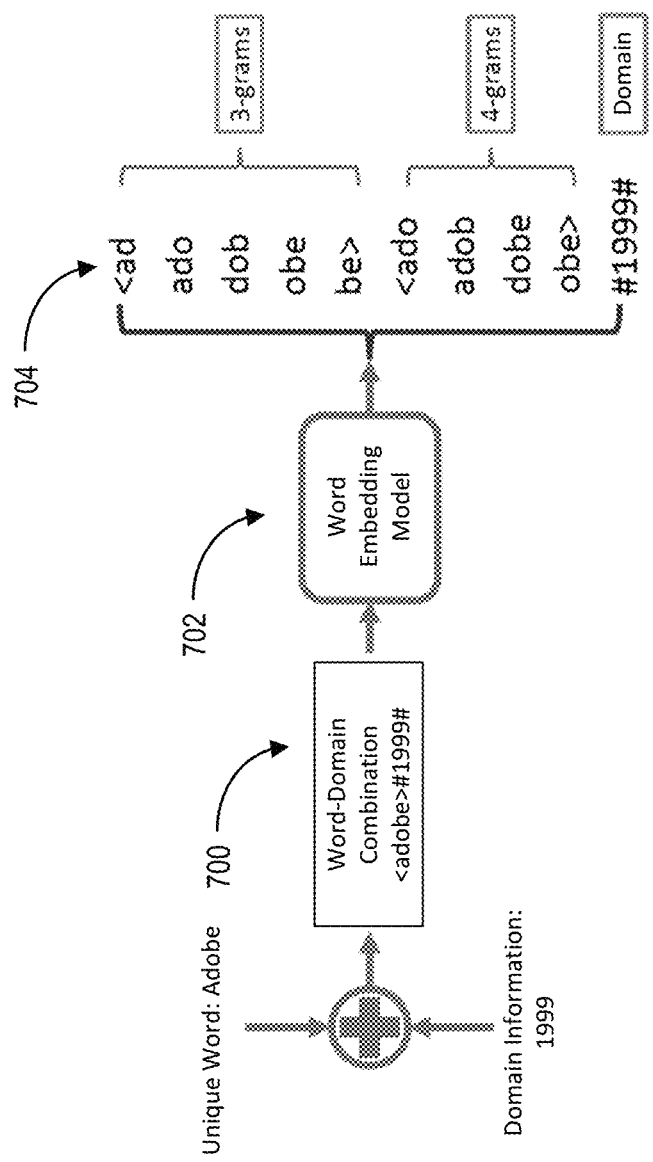
FIG. 7 illustrates an overview of generating a dynamic vector representation for a unique word in accordance with one or more embodiments.

As mentioned, the dynamic word embedding system 102 can generate dynamic vector representations of unique words. In particular, the dynamic word embedding system 102 can generate dynamic vector representations of unique words to include embedded domain information directly within the vector representations. FIG. 7 illustrates utilizing a word embedding model to generate a dynamic vector representation of a unique word in accordance with one or more embodiments.

As illustrated in FIG. 7, the dynamic word embedding system 102 generates a dynamic vector representation 704 of a unique word "adobe" based on domain information ("1999") indicating a time interval in which the unique word is grouped (which grouping is described above). To generate the dynamic vector representation 704, the dynamic word embedding system 102 concatenates the domain information "1999" to the unique word "adobe." In some embodiments, the dynamic word embedding system 102 utilizes particular concatenation rules to separate the unique word from the domain information. For example, as shown in FIG. 7, the dynamic word embedding system 102 separates the unique word "adobe" from the domain information "1999" by utilizing particular delineating or delimiting characters (e.g., "<" or "#"). Thus, the dynamic word embedding system 102 generates a concatenated word-domain combination 700 of "<adobe>#1999#."

Based on concatenating the unique word and the domain information, the dynamic word embedding system 102 further utilizes a word embedding model 702 to generate a dynamic vector representation 704 of the concatenated word-domain combination. By concatenating the domain information together with the unique word and generating a dynamic vector representation 704 from the concatenated word-domain combination, the dynamic word embedding system 102 embeds domain information directly within vector representations. As a result, the dynamic word embedding system 102 can accommodate personalized domains and can flexibly adapt to different domain types.

For example, as shown in FIG. 7, the dynamic word embedding system 102 utilizes a word embedding model 702 in the form of a character n-gram model (e.g., Skip-Gram or fastText) to generate the dynamic vector representation 704. More specifically, the dynamic word embedding system 102 generates character grams or subwords for the unique word and the domain information. As shown, the dynamic word embedding system 102 generates 3-character grams and 4-character grams representing characters of the unique word (or the word-domain combination). The dynamic word embedding system 102 also generates a domain embedding as part of the dynamic vector representation 704. By generating a dynamic vector representation 704 that includes character level information (e.g., the character grams), the dynamic word embedding system 102 can adapt to determine semantic meanings for OOV words. Indeed, rather than being limited to only word-level embeddings (which prevents determining meanings of OOV words because the words are unknown to the system), as is the case for many conventional systems, the dynamic word embedding system 102 can combine different character grams from unique words to determine semantic meanings of OOV words. Additionally, the dynamic word embedding system 102 can generate character grams of various sizes and the character grams are not limited to 3-character and 4-character grams.

By utilizing a particular pattern for the domain information, the dynamic word embedding system 102 ensures that the domain can be encoded as an integer. In addition, the dynamic word embedding system 102 combines (e.g., sums) and normalizes the character gram components to generate the dynamic vector representation 704. In some embodiments, the dynamic word embedding system 102 can represent a dynamic vector representation 704 as:

$$v_{w,t} = \delta(\Sigma v_{n\_gram} + v_t)$$

where n ranges from a bottom threshold (e.g., 3) to a top threshold (e.g., 6), $\delta(x)$ is a function to normalize the word vector, and $v_t$ is a representation of the domain (e.g., the time). By utilizing the above vector representation, the dynamic word embedding system 102 can extract the basic word stem from each individual word and disambiguate the sense shifts from the morphological level. Indeed, sense shifts frequently have a strong correlation with part-of-speech tags, where, for example, an adjective form of a word stem can have different shift speeds from its noun form.

In one or more embodiments, the dynamic word embedding system 102 utilizes a particular format or pattern (e.g., "<word>#domain#") to tokenize a word-domain combination utilizing the word embedding model 702. For example, the word embedding model 702 maps a word to subword representations (e.g., characters) and maps the domain to a domain representation. The dynamic word embedding system 102 further combines the mapped representations (e.g., utilizing a sum as a combination function) to generate a new word representation for the word in the word-domain combination.

While FIG. 7 illustrates one particular word embedding model 702, the character n-gram model, the dynamic word embedding system 102 can utilize other word embedding models in one or more embodiments. For example, the dynamic word embedding system 102 can utilize a different Word2Vec model, a GloVe model, or a BERT model as the word embedding model 702. Additionally, while FIG. 7 illustrates a time interval domain, the dynamic word embedding system 102 can generate dynamic vector representations including domain information for other domain types as well. For example, the dynamic word embedding system 102 can generate a numerical representation of a domain to include as part of a dynamic vector representation. In addition, as shown in FIG. 7, the dynamic word embedding system 102 can concatenate the numerical domain representation to the unique word to generate a concatenated word-domain combination.

Figure 8:
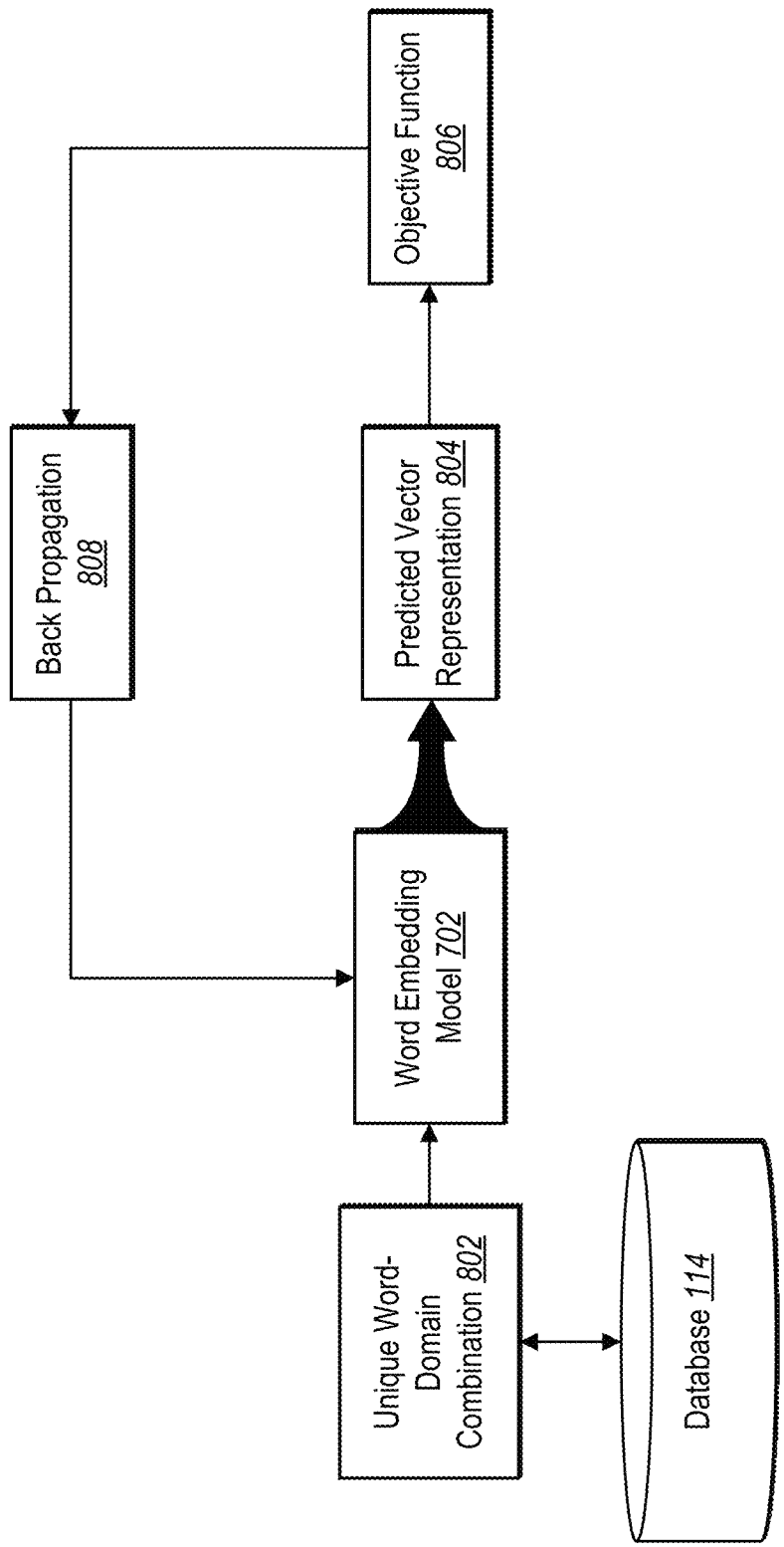
FIG. 8 illustrates an overview of training a word embedding model in accordance with one or more embodiments.

As mentioned, the dynamic word embedding system 102 can train the word embedding model 702 to generate accurate dynamic vector representations of unique words or word-domain combinations. FIG. 8 illustrates a process for training the word embedding model 702 in accordance with one or more embodiments. As shown, the dynamic word embedding system 102 can train the word embedding model 702 more efficiently than conventional systems. Indeed, whereas many conventional systems require a more expensive multi-step process to train a word embedding model, the dynamic word embedding system 102 can train the word embedding model 702 once based on appended word-domain combinations.

As illustrated in FIG. 8, the dynamic word embedding system 102 accesses a unique word-domain combination 802 (e.g., the word-domain combination 700) from the database 114. For example, the dynamic word embedding system 102 identifies a unique word from a domain-specific unique word grouping and concatenates the domain information to the unique word, as described above. In addition, the dynamic word embedding system 102 further inputs the unique word-domain combination 802 into the word embedding model 702, whereupon the word embedding model 702 generates a predicted vector representation 804 for the unique word-domain combination 802. In some embodiments, the word embedding model 702 utilizes internal parameters and weights to determine features (e.g., observable features and/or latent features) associated with the unique word-domain combination 802. Based on internally determining these features, the word embedding model 702 generates the predicted vector representation 804.

As further shown, the dynamic word embedding system 102 utilizes an objective function 806 to improve the prediction of vector representations. In particular, the dynamic word embedding system 102 utilizes the objective function 806 to determine a measure of accuracy (or error) associated with the word embedding model 702. For example, the dynamic word embedding system 102 inputs the predicted vector representation 804 into the objective function 806 to determine whether the predicted vector representation 804 satisfies the objective function 806.

To elaborate, the dynamic word embedding system 102 implements the objective function 806 to maximize a probability of co-occurrence words while minimizing a probability of non-co-occurrence words within a given domain (e.g., time interval). Co-occurrence words are words with an above-chance frequency of occurring together in a single source or corpus. In some embodiments, the dynamic word embedding system 102 utilizes an objective function 806 of log average probability to learn vector representations v of words, as given by:

$$arg \max \Sigma \log \theta(v_{w,t} v_{c,t}) + \Sigma \log \theta(-v_{w,t} v_{c',t})$$

where $\theta(x)$ is the sigmoid function $$\frac{1}{1+e^{-x}},$$

c is the contextual word of w, and c' is not the contextual word of w.

Relating to co-occurrence words, in training the word embedding model 702, the dynamic word embedding system 102 samples two words to determine if they are co-occurrence words relative to each other. In some embodiments, the dynamic word embedding system 102 samples a word from a domain of an input word to determine co-occurrence. This in-domain sampling (e.g., temporality sensitive sampling) helps ensure more accurate contextual information as compared to conventional systems that sample words from entire vocabularies rather than from specific domains.

Based on the objective function 806, the dynamic word embedding system 102 further performs a back propagation 808. More specifically, the dynamic word embedding system 102 performs the back propagation 808 to modify one or more weights or parameters associated with the word embedding model 702. Indeed, the dynamic word embedding system 102 modifies the internal weights/parameters of various layers of the word embedding model 702 in accordance with the objective function 806 to try to accomplish the objective of maximizing the probability of co-occurrence words and minimizing the probability of non-co-occurrence words. As a result, the word embedding model 702 generates more accurate predicted vector representations (that more closely satisfy the objective function 806) on subsequent iterations of the training process.

Indeed, the dynamic word embedding system 102 repeats the training process illustrated in FIG. 8 for multiple iterations or epochs. For example, the dynamic word embedding system 102 identifies different unique word-domain combinations to input into the word embedding model 702 to generate respective predicted vector representations. The dynamic word embedding system 102 also utilizes the objective function 806 to determine whether or not the predicted vector representations satisfy the objective function 806 (e.g., by achieving a threshold level of co-occurrence words and/or a threshold level of non-co-occurrence words). With each iteration, the dynamic word embedding system 102 also performs the back propagation 808 to continually modify the weights/parameters of the word embedding model 702 until the word embedding model 702 outputs predicted vector representations that satisfy the objective function 806.

In some embodiments, the dynamic word embedding system 102 can access unique word-domain combinations to use as training data from the New York Times dataset described above in relation to FIG. 6. For example, the dynamic word embedding system 102 can utilize unique words from one of the three-year time interval domains. In addition, the dynamic word embedding system 102 can generate word-domain combinations to input into the word embedding model 702 by appending respective domain information (e.g., a time of origin or the time interval) to a unique word. The dynamic word embedding system 102 can further train the word embedding model 702 as described above.

Figure 9:
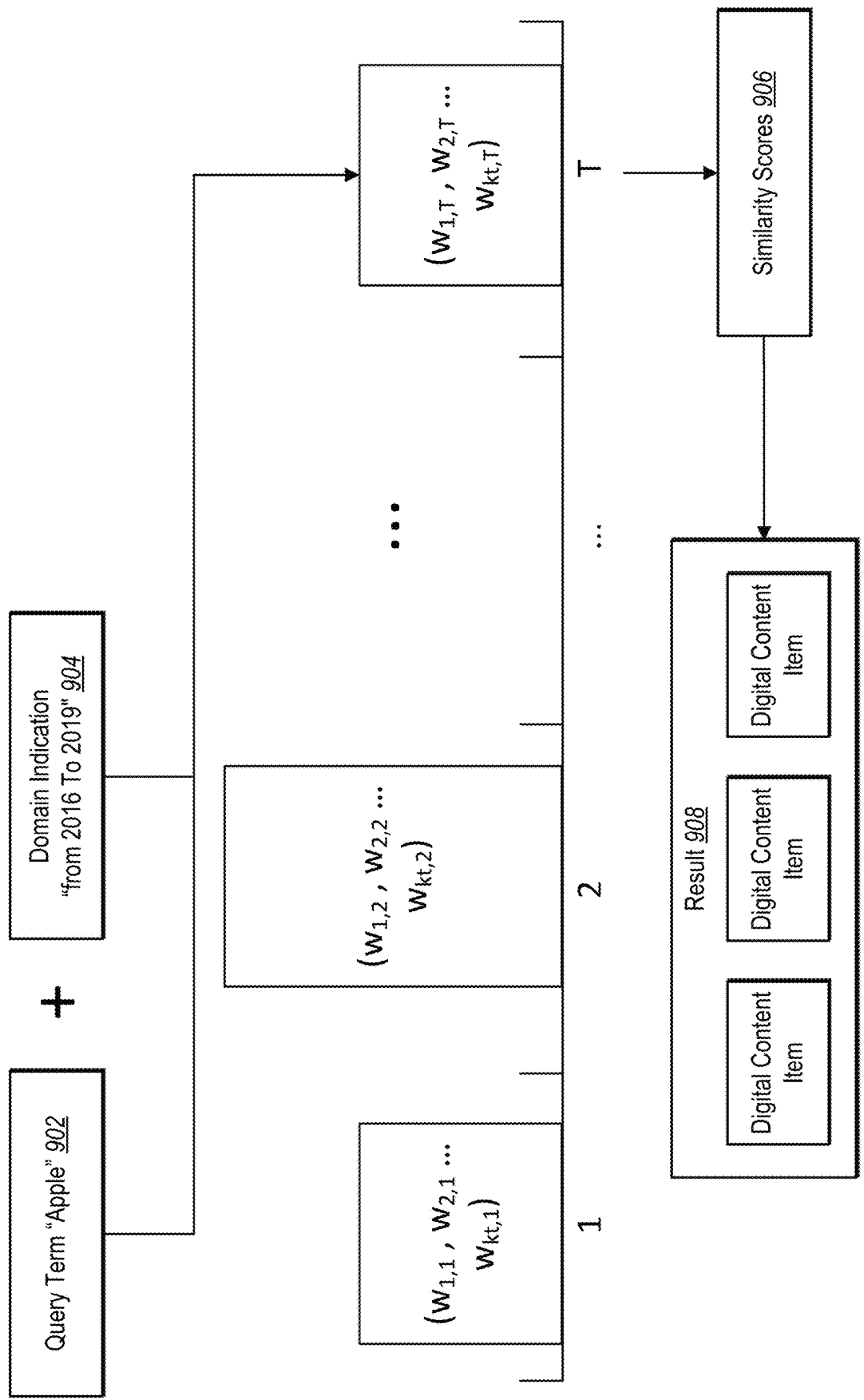
FIG. 9 illustrates an overview of generating a result for a query based on similarity scores in accordance with one or more embodiments.

As mentioned, the dynamic word embedding system 102 can generate a result for a query based on dynamic vector representations of unique words. In particular, the dynamic word embedding system 102 can expand a query (e.g., the query 302) by determining similarity scores between query terms and unique words. FIG. 9 illustrates generating a result 908 based on a query term 902 in accordance with one or more embodiments. As shown, the dynamic word embedding system 102 determines similarity scores 906 between the query term 902 and unique words within a particular domain (e.g., the time interval T) corresponding to the domain indication 904 ("From 2016 to 2019"). As mentioned above, the dynamic word embedding system 102 can determine the domain indication 904 from a domain indicator (e.g., the time interval indicator 304) or automatically from text of a query.

As illustrated in FIG. 9, the dynamic word embedding system 102 receives a query term 902 ("Apple") together with a domain indication 904 ("From 2016 to 2019"). Based on the domain indication 904, the dynamic word embedding system 102 determines a domain from which to generate the result 908 for the query. For instance, the dynamic word embedding system 102 compares the domain indication 904 with domains of the various groups of unique words $w_{i,t} \in$ [$(w_{1,1}, w_{2,1}, \ldots, w_{kt,1}), (w_{1,2}, w_{2,2}, \ldots, w_{kt,2}), \ldots, (w_{1,T}, w_{2,T}, \ldots, w_{kt,T})$] (described above in relation to FIG. 5).

Upon identifying a domain (e.g., the time interval T) that matches the domain indication 904, the dynamic word embedding system 102 further determines similarity scores 906 for unique words (or word-domain combinations) within the domain. More particularly, the dynamic word embedding system 102 compares the unique words ($w_{1,T}, w_{2,T}, \ldots, w_{kt,T}$) within the domain T with the query term 902 to determine the similarity scores 906. For example, the dynamic word embedding system 102 generates a vector representation of a query term to compares with the dynamic vector representation of a unique word (or a word-domain combination). In some embodiments, the dynamic word embedding system 102 determines the similarity scores 906 in accordance with:

$$r(w, t) = \sum_{q_i \in q} \lambda p(w | q_i) + (1 - \lambda) p(w | q_i, t)$$

where q represents a query, $q_i$ represents a query term (or a vector representation of a query term) within the query (e.g., the query term 902), λ is a coefficient within [0,1] to help balancing between general word embeddings and dynamic word embeddings, and $p(w|q_i)$ is a scoring function that measures the distance between the query term $q_i$ and unique words within a particular vocabulary (i.e., within a particular domain) such as ($w_{1,T}, w_{2,T}, \ldots, w_{kt,T}$). If λ is lower (closer to 0), the dynamic word embedding has more impact, and vice-versa. In these or other embodiments, the dynamic word embedding system 102 utilizes a cosine similarity function for the scoring function, such as:

$$p(w | q_i) = \frac{w \cdot q_i}{\|w\| \cdot \|q_i\|}$$

to determine the similarity scores 906 between the word w and the query term $q_i$.

Indeed, the dynamic word embedding system 102 can utilize the above function(s) to determine similarity scores 906 for multiple unique words within the domain T. In addition, the dynamic word embedding system 102 can utilize the similarity scores 906 to determine similarity scores for other query terms for a query that includes multiple query terms. Further, the dynamic word embedding system 102 can utilize the similarity scores 906 to generate the result 908. For instance, the dynamic word embedding system 102 can identify unique words within the domain T that have similarity scores that satisfy a similarity threshold. In some embodiments, the dynamic word embedding system 102 ranks the unique words in the domain T according to their respective similarity scores.

Additionally, the dynamic word embedding system 102 can identify digital content items in which the unique words occur to provide as part of the result 908. For example, the dynamic word embedding system 102 can rank digital content items based on similarity scores of unique words that occur within the digital content items. Indeed, the dynamic word embedding system 102 can identify a number of unique words associated with a single digital content item and can generate a cumulative or composite similarity score for the digital content item by combining the similarity scores of the unique words together. In some embodiments, the dynamic word embedding system 102 combines unique word similarity scores by summing them, while in other embodiments, the dynamic word embedding system 102 generates a weighted combination of unique word similarity scores by weighting some unique words more heavily than others (e.g., words that are more impactful or important based on the query).

Based on the similarity scores of the digital content items, the dynamic word embedding system 102 identifies those digital content items to provide as part of the result 908. For example, the dynamic word embedding system 102 can provide digital content items that satisfy a similarity threshold and/or can provide digital content items in a ranked order based on respective similarity scores. As described above, the dynamic word embedding system 102 can provide the result 908 for display within a user interface of the client device 108.

As mentioned, the dynamic word embedding system 102 can provide improvements in accuracy over conventional word embedding systems. Indeed, experimenters have demonstrated that the dynamic word embedding system 102 generates digital content clusters and unique word groups more accurately than conventional systems. FIG. 10 illustrates a table comparing the accuracy of the dynamic word embedding system 102 with that of several conventional systems in accordance with one or more embodiments.

To determine the results of the table in FIG. 10, the various systems implement a test set to evaluate whether the embedding model can categorize words and their respective meanings across yearly domains. For example, the systems utilize the test set described by Z. Yao, Y. Sun, W. Ding, N. Rao, and H. Xiong in *Dynamic Word Embeddings for Evolving Semantic Discovery*, Proceedings of the Eleventh ACM Int'l Conf. on Web Search and Data Mining 673-81 (2018), which is incorporated herein by reference in its entirety. The test set includes 1,888 entries with three different columns, word, section label, and year. The section label has 11 different categories and indicates close meanings of words at certain years. To measure the effective of the system, the system (e.g., the dynamic word embedding system 102) utilizes the following function:

$$F_\beta = \frac{(\beta^2 + 1) * P * R}{\beta^2 * P + R}$$

where P represents precision and R represents recall. For the test, correct word pairs are those with the same section label and from the same cluster/group or word pairs not sharing a section label and from different clusters. Otherwise, the selections are considered incorrect.

As shown, the dynamic word embedding system 102 the dynamic word embedding system 102 is more accurate than the conventional systems such as the static system, the linear system, the Procrustes system, the hierarchy system, and the DW2V system. For example, the dynamic word embedding system 102 enjoys an effectiveness of identifying correct word pairs from 10 clusters at 0.810, which is higher than any of the other illustrated conventional systems. Similarly, for 15 clusters and 20 clusters, the dynamic word embedding system 102 also enjoys advantages in accuracy over conventional systems.

Figure 11:
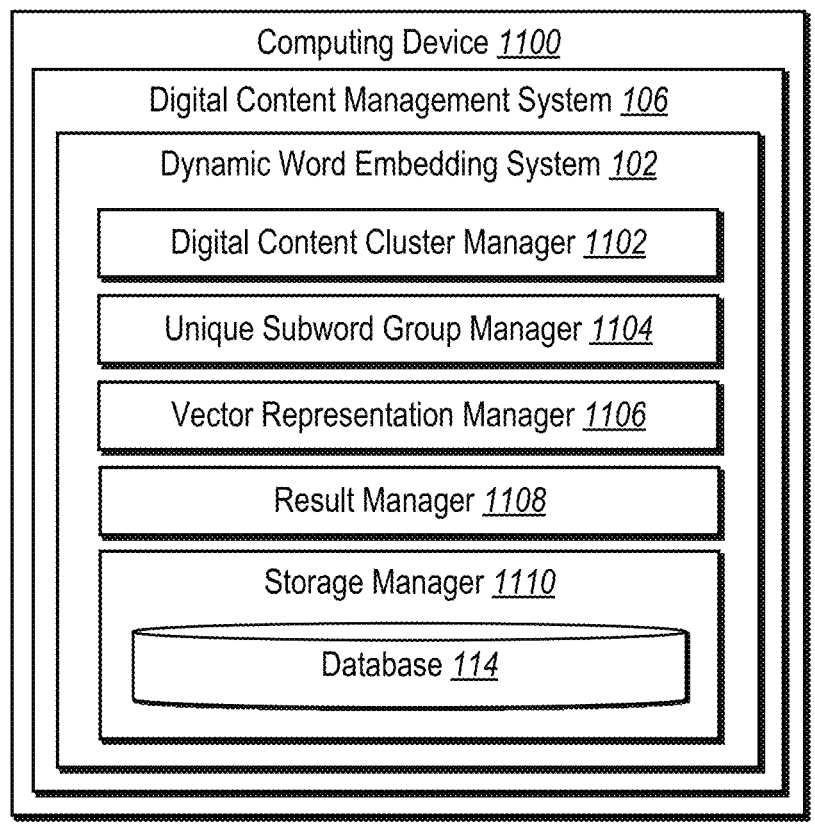
FIG. 11 illustrates a schematic diagram of a dynamic word embedding system in accordance with one or more embodiments.

Looking now to FIG. 11, additional detail will be provided regarding components and capabilities of the dynamic word embedding system 102. Specifically, FIG. 11 illustrates an example schematic diagram of the dynamic word embedding system 102 on an example computing device 1100 (e.g., one or more of the client device 108 and/or the server(s) 104). As shown in FIG. 11, the dynamic word embedding system 102 may include a digital content cluster manager 1102, a unique word group manager 1104, a vector representation manger 1106, a result manager 1108, and a storage manager 1110. The storage manager 1110 can include one or more memory devices that store various data such as digital content items, queries, results, similarity scores, and word details, and word embedding models.

As just mentioned, the dynamic word embedding system 102 includes a digital content cluster manager 1102. In particular, the digital content cluster manager 1102 manages, determines, generates, identifies, groups, clusters, or otherwise arranges digital content items into clusters. As described above, the digital content cluster manager 1102 can generate clusters of digital content items based on domain information associated with the digital content items. For example, the digital content cluster manager 1102 groups digital content items whose times of origin are within a particular time interval into a time interval cluster. For other domains, the digital content cluster manager 1102 can group digital content items that share a location, that are associated with a particular product type, or that correspond to a common username. In some embodiments, the digital content cluster manager 1102 further communicates with the storage manager 1110 to access and/or store digital content items within the database 114.

As shown, the dynamic word embedding system 102 also includes a unique subword group manager 1104. In particular, the unique subword group manager 1104 can manage, generate, determine, group, cluster, or otherwise arrange unique subwords or words into particular domain-specific groups. As described above, the unique subword group manager 1104 can identify unique words that occur within digital content items and can further generate groups of the unique subwords or words that correspond to domains of the digital content items. In some embodiments, the unique subword group manager 1104 can communicate with the storage manager 1110 to access and/or store unique subword or word groups within the database 114.

Further, the dynamic word embedding system 102 includes a vector representation manager 1106. In particular, the vector representation manager 1106 can manage, generate, determine, or otherwise identify dynamic vector representations of unique words based on their subwords. For example, as described above, the vector representation manager 1106 can generate dynamic vector representations of unique subwords or words by concatenating domain information to a unique subword and utilizing a word embedding model to generate a vector representation of the concatenated subword-domain combination. Additionally, the vector representation manager 1106 can train a word embedding model to generate accurate dynamic vector representations, as described in further detail above. In some embodiments, the concatenation of a subword and a domain is a preprocessing step, and the vector representation manager 1106 receives the concatenated subword-domain combination and generates a vector representation therefrom. In one or more embodiments, the vector representation manager 1106 can further communicate with the storage manager 1110 to access and/or store dynamic vector representations within the database 114.

As illustrated, the dynamic word embedding system 102 includes a result manager 1108. In particular, the result manager 1108 can manage, determine, generate, provide, display, and/or identify a result for a query. For example, the result manager 1108 can receive or identify a query that includes one or more query terms. In addition, the result manager 1108 can analyze the query to determine similarity scores between the query terms and unique words within an identified domain. For instance, the result manager 1108 identifies a domain indication and determines similarity scores for unique words within a domain-specific group of unique words that corresponds to the indicated domain. In some embodiments, the result manager 1108 communicates with the storage manager 1110 to access and/or store results (including digital content items) within the database 114.

In one or more embodiments, each of the components of the dynamic word embedding system 102 are in communication with one another using any suitable communication technologies. Additionally, the components of the dynamic word embedding system 102 can be in communication with one or more other devices including one or more client devices described above. It will be recognized that although the components of the dynamic word embedding system 102 are shown to be separate in FIG. 11, any of the subcomponents may be combined into fewer components, such as into a single component, or divided into more components as may serve a particular implementation. Furthermore, although the components of FIG. 11 are described in connection with the dynamic word embedding system 102, at least some of the components for performing operations in conjunction with the dynamic word embedding system 102 described herein may be implemented on other devices within the environment.

The components of the dynamic word embedding system 102 can include software, hardware, or both. For example, the components of the dynamic word embedding system 102 can include one or more instructions stored on a computer-readable storage medium and executable by processors of one or more computing devices (e.g., the computing device 1100). When executed by the one or more processors, the computer-executable instructions of the dynamic word embedding system 102 can cause the computing device 1100 to perform the methods described herein. Alternatively, the components of the dynamic word embedding system 102 can comprise hardware, such as a special purpose processing device to perform a certain function or group of functions. Additionally or alternatively, the components of the dynamic word embedding system 102 can include a combination of computer-executable instructions and hardware.

Furthermore, the components of the dynamic word embedding system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the dynamic word embedding system 102 may be implemented as part of a stand-alone application on a personal computing device or a mobile device. Alternatively or additionally, the components of the dynamic word embedding system 102 may be implemented in any application that allows creation and delivery of marketing content to users, including, but not limited to, applications in ADOBE EXPERIENCE MANAGER, ADOBE DOCUMENT CLOUD, and ADOBE CREATIVE CLOUD, such as ADOBE INDESIGN, ADOBE ACROBAT, and ADOBE PREMIERE. "ADOBE," "ADOBE EXPERIENCE MANAGER," "ADOBE DOCUMENT CLOUD," "ADOBE CREATIVE CLOUD," "ADOBE INDESIGN," "ADOBE ACROBAT," and "ADOBE PREMIERE" are trademarks of Adobe Inc. in the United States and/or other countries.

FIGS. 1-11, the corresponding text, and the examples provide a number of different systems, methods, and non-transitory computer readable media for generating query results based on determining dynamic vector representations of unique words that include domain information. In addition to the foregoing, embodiments can also be described in terms of flowcharts comprising acts for accomplishing a particular result. For example, FIG. 12 illustrates a flowchart of an example sequence or series of acts in accordance with one or more embodiments.

Figure 12:
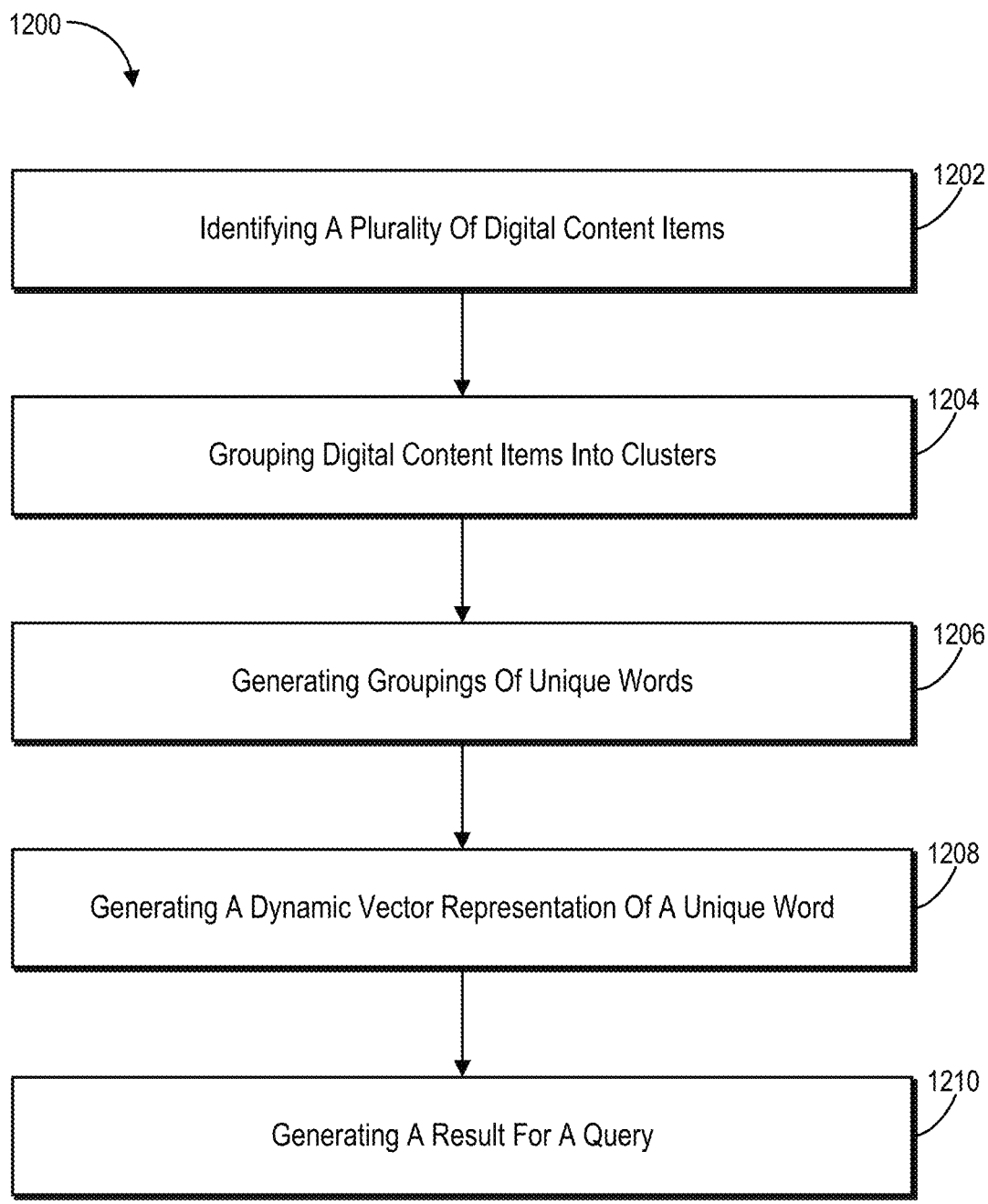
FIG. 12 illustrates a flowchart of a series of acts for generating a result based on a dynamic vector representation of a unique word in accordance with one or more embodiments.

While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer readable medium can comprise instructions, that when executed by one or more processors, cause a computing device to perform the acts of FIG. 12. In still further embodiments, a system can perform the acts of FIG. 12. Additionally, the acts described herein may be repeated or performed in parallel with one another or in parallel with different instances of the same or other similar acts.

FIG. 12 illustrates an example series of acts 1200 for generating query results based on determining dynamic vector representations of unique words that include domain information. In particular, the series of acts 1200 includes an act 1202 of identifying a plurality of digital content items. For example, the act 1202 can involve identifying a plurality of digital content items comprising domain information. The domain information of the digital content items can indicate respective times of origin of the digital content items.

In addition, the series of acts 1200 includes an act 1204 of grouping digital content items into clusters. In particular, the act 1204 can involve grouping the plurality of digital content items into clusters according to their respective domains based on the domain information. For instance, the act 1204 can involve generating time interval clusters for the plurality of digital content items by grouping digital content items whose times of origin are within a threshold period of time. Example domains can include one or more of a time interval, a demographic label, a product type, a digital content type, a brand name, a location, or a username.

As shown, the series of acts 1200 includes an act 1206 of generating groupings of unique words. In particular, the act 1206 can involve generating, for the clusters of digital content items, corresponding groupings of unique words that occur within digital content items of respective clusters. For example, the act 1206 can involve determining unique words that occur within the plurality of digital content items. In addition, the act 1206 can involve generating, for the plurality of digital content items, time interval groupings of the unique words by determining which time interval clusters include digital content items where the unique words occur.

Further, the series of acts 1200 includes an act 1208 of generating a dynamic vector representation of a unique word. In particular, the act 1208 can involve generating, utilizing a word embedding model for a unique word within a grouping of unique words, a dynamic vector representation of the unique word comprising a domain embedding of a domain associated with the grouping. In some embodiments, the act 1208 can involve generating a numerical representation of the domain associated with the grouping of unique words. In addition, the act 1208 can involve concatenating, to the unique word, the numerical representation of the domain associated with the grouping. Further, the act 1208 can involve generating the dynamic vector representation of the unique word by utilizing a character n-gram model to encode the unique word into character grams and generate the domain embedding based on the numerical representation of the domain. In some embodiments, the act 1208 can involve generating, utilizing a word embedding model for a unique word within a time interval grouping, a dynamic vector representation of the unique word comprising a time embedding of the time interval grouping.

The series of acts 1200 also includes an act 1210 of generating a result for a query. In particular, the act 1210 can involve generating, from a cluster of digital content items corresponding to the domain associated with the grouping, a result for a query based on the dynamic vector representation of the unique word. In some embodiments, the series of acts 1200 can include an act of receiving, from a client device, the query comprising one or more query terms and an indication of the domain associated with the grouping from which to generate the result. In these or other embodiments, the act 1210 can involve generating, for display on the client device, a result for the query based on comparing the dynamic vector representation of the unique word with the one or more query terms. For example, the act 1210 can involve generating the result for the query by identifying, based on the similarity scores, a digital content item from a time interval cluster that corresponds to the one or more query terms. The act 1210 can also involve determining additional similarity scores between a second unique word associated with a second domain and the one or more query terms and wherein generating the result comprises comparing the similarity scores and the additional similarity scores to identify one or more digital content items that correspond to higher similarity score.

In some embodiments, the series of acts 1200 includes an act of receiving, from the client device, an indication of a time interval over which to generate the result. In addition, the series of acts 1200 can include an act of generating the result for the query by identifying a digital content item from a time interval cluster corresponding to the indication of the time interval over which to generate the result.

In addition, the series of acts 1200 can include an act of determining similarity scores between the one or more query terms and the dynamic vector representation of the unique word and an act of generating, based on the similarity scores, the result for the query by identifying one or more digital content items from the domain associated with the grouping corresponding to the query. For example, the dynamic word embedding system 102 can determine similarity scores between the one or more query terms and the dynamic vector representation of the unique word by generating vector representations for the one or more query terms and determining distances between the vector representations of the one or more query terms and the dynamic vector representation of the unique word in a vector space. The series of acts 1200 can also include an act of training the word embedding model to generate dynamic vector representations of unique words using an objective function to increase a probability of co-occurrence words. Training the word embedding model can include training the word embedding model to generate dynamic vector representations of unique words using an objective function to increase a probability of co-occurrence words and decrease a probability of non-co-occurrence words based on training data.

In some embodiments, the dynamic word embedding system 102 can perform a step for generating a dynamic vector representation of a unique word occurring within the plurality of digital content items, the dynamic vector representation indicating a domain associated with the unique word based on the domain information of the plurality of digital content items. In conjunction with the above description, including the specific algorithms, FIG. 13 illustrates a series of acts 1302-1316 that the dynamic word embedding system 102 can perform as part of a step for generating a dynamic vector representation of a unique word occurring within the plurality of digital content items, the dynamic vector representation indicating a domain associated with the unique word based on the domain information of the plurality of digital content items.

Figure 13:
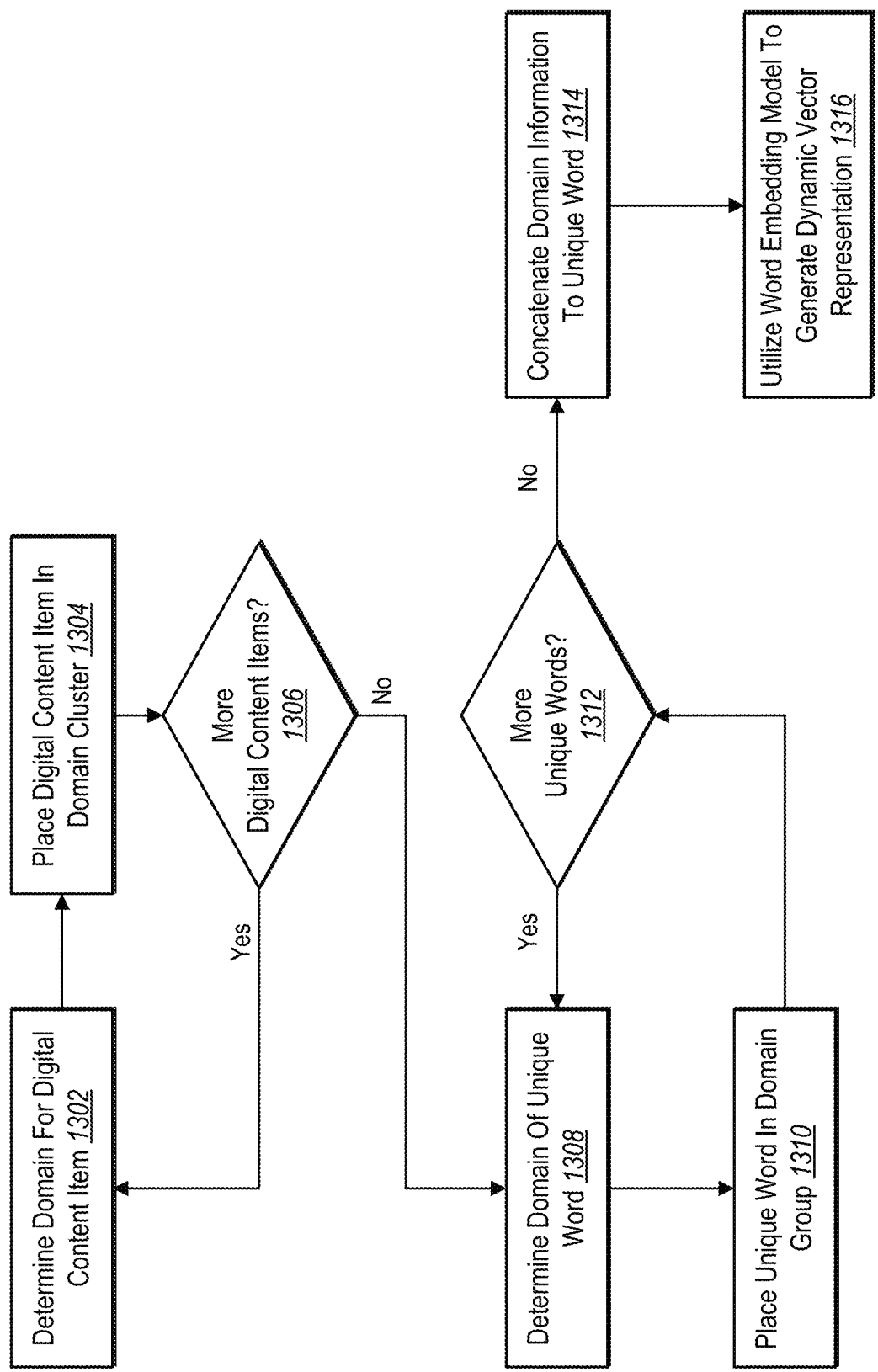
FIG. 13 illustrates a series of acts involved in performing a step for generating a dynamic vector representation of a unique word occurring within the plurality of digital content items, the dynamic vector representation indicating a domain associated with the unique word based on the domain information of the plurality of digital content items in accordance with one or more embodiments.

As illustrated in FIG. 13, the dynamic word embedding system 102 performs an act 1302 to determine a domain for a digital content item. In particular, the dynamic word embedding system 102 determines a domain associated with a digital content item by identifying domain information associated with the digital content item such as a time of origin, a location of origin, a creator's username, etc. In some embodiments, as described above, the dynamic word embedding system 102 can determine the domain associated with the digital content item by analyzing metadata associated with the digital content item.

As shown, the dynamic word embedding system 102 can further perform an act 1304 to place the digital content item in a domain cluster. In particular, the dynamic word embedding system 102 groups the digital content item into a cluster that corresponds to the domain information of the digital content item. For example, the dynamic word embedding system 102 identifies a time of origin for the digital content item and places the digital content item into a domain-specific cluster of digital content items associated with a particular time interval that includes the time of origin.

As further shown, the dynamic word embedding system 102 performs an act 1306 to determine whether there are more digital content items to analyze. In particular, the dynamic word embedding system 102 determines whether or not every digital content item within a database (e.g., the database 114) or a repository has been grouped into a respective cluster. Upon determining that there are more digital content items yet to be clustered, the dynamic word embedding system 102 repeats the acts 1302-1306 until the dynamic word embedding system 102 determines that there are no more digital content items left to place in domain clusters.

Upon determining that there are no more digital content items left to cluster, the dynamic word embedding system 102 can further perform an act 1308 to determine a domain of a unique word. In particular, as described above, the dynamic word embedding system 102 can generate groups of unique words that correspond to domains of the digital content item clusters. Thus, the dynamic word embedding system 102 can analyze the digital content items to identify unique words that occur within the digital content items. In addition, the dynamic word embedding system 102 can associate the domain of the digital content item from which a unique word is identified with the unique word itself.

Based on determining a domain associated with a unique word, the dynamic word embedding system 102 can further perform an act 1310 to place the unique word in a domain group. Particularly, the dynamic word embedding system 102 can identify a group of unique words that correspond to domain information that matches the domain information of the unique word. For instance, the dynamic word embedding system 102 determines that the unique word occurs within a digital content item from the time interval of 2016 to 2019, and the dynamic word embedding system 102 therefore places the unique word into the group of unique words corresponding to the 2016 to 2019 time interval.

Additionally, the dynamic word embedding system 102 performs an act 1312 to determine whether there are more unique words to place within domain-specific groups. Upon determining that there are more unique words still to place in groups, the dynamic word embedding system 102 repeats the acts 1308-1312 until no more unique words are left to place in domain groups.

Upon determining that there are no more unique words left to group, the dynamic word embedding system 102 can perform an act 1314 to concatenate the domain information to the unique word. In particular, as described above, the dynamic word embedding system 102 identifies domain information associated with a unique word (or associated with a group of the unique word), and the dynamic word embedding system 102 further concatenates a numerical representation of the domain information to the unique word.

Further, the dynamic word embedding system 102 performs an act 1316 to utilize a word embedding model (e.g., the word embedding model 702) to generate a dynamic vector representation of the unique word (or the concatenated word-domain combination). More specifically, the dynamic word embedding system 102 inputs the unique word and the concatenated domain information into the word embedding model, whereupon the word embedding model generates an output in the form of a dynamic vector representation of the unique word together with the embedded domain information.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
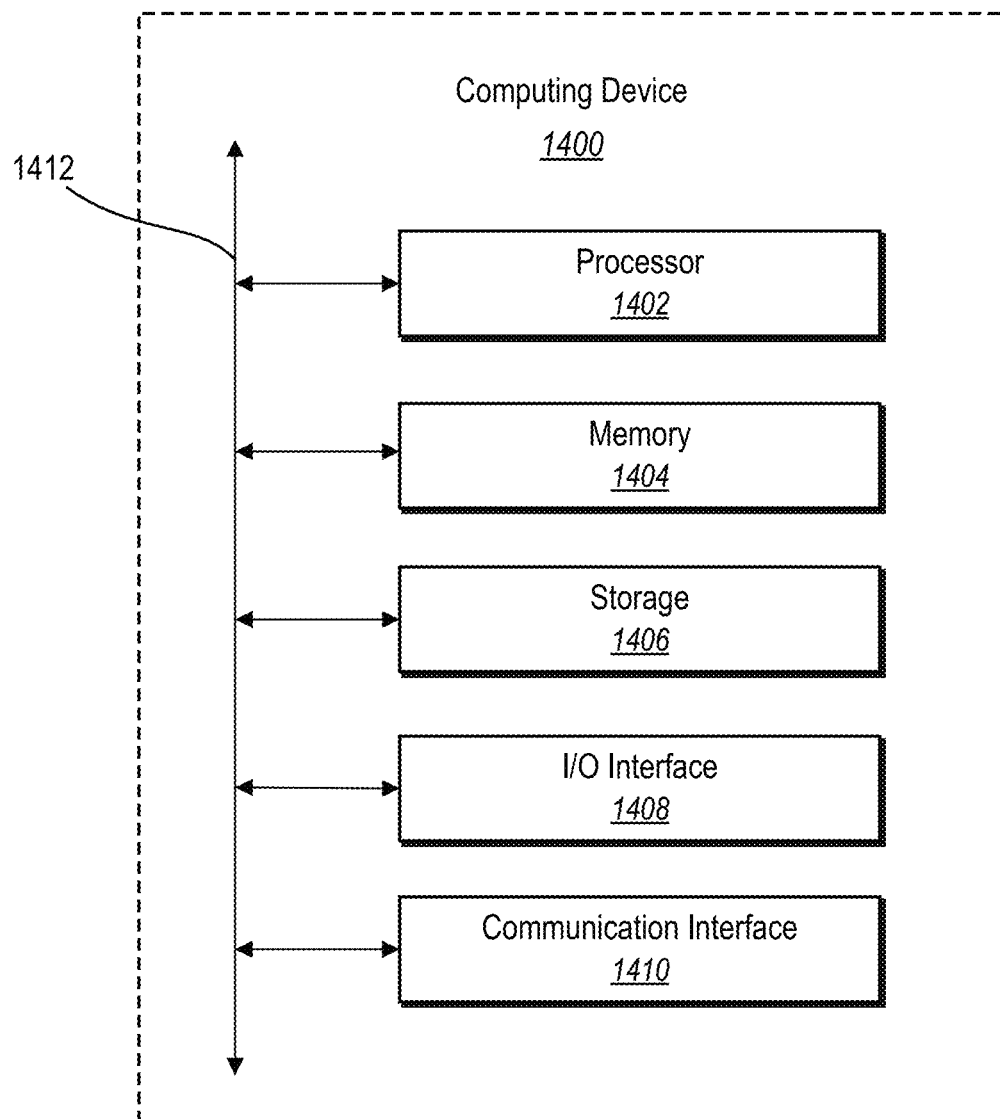
FIG. 14 illustrates a block diagram of an example computing device in accordance with one or more embodiments.

FIG. 14 illustrates, in block diagram form, an example computing device 1400 (e.g., the computing device 1100, the client device 108, and/or the server(s) 104) that may be configured to perform one or more of the processes described above. One will appreciate that the dynamic word embedding system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   group a plurality of digital content items into domain clusters reflecting domain information associated with the plurality of digital content items;
   generate unique word groupings from domain clusters according to unique words that occur within the plurality of digital content items such that unique words within respective unique word groupings share common domains;
   generate, utilizing a word embedding model, a dynamic vector representation for a unique word within a unique word grouping, the dynamic vector representation comprising a domain embedding of a domain associated with the grouping; and
   generate, from a domain cluster corresponding to the domain associated with the unique word grouping, a domain-specific query result based on the dynamic vector representation for the unique word.

2. The non-transitory computer readable medium of claim 1, further comprising instructions that, when executed by the at least one processor, cause the computing device to generate a numerical representation of the domain associated with the unique word grouping.

3. The non-transitory computer readable medium of claim 2, further comprising instructions that, when executed by the at least one processor, cause the computing device to concatenate, to the unique word, the numerical representation of the domain associated with the unique word grouping.

4. The non-transitory computer readable medium of claim 1, further comprising instructions that, when executed by the at least one processor, cause the computing device to generate the dynamic vector representation of the unique word by utilizing a character n-gram model to:
   encode the unique word into character grams;
   concatenate an indication of the domain to the character grams; and
   generate vector representations of the character grams combined with the indication of the domain.

5. The non-transitory computer readable medium of claim 1, further comprising instructions that, when executed by the at least one processor, cause the computing device to receive, from a client device, a query comprising one or more query terms and an indication of the domain associated with the unique word grouping from which to generate the domain-specific query result.

6. The non-transitory computer readable medium of claim 5, further comprising instructions that, when executed by the at least one processor, cause the computing device to:
   determine similarity scores between the one or more query terms and the dynamic vector representation of the unique word; and
   generate, based on the similarity scores, the domain-specific query result for the query by identifying one or more digital content items from the domain associated with the unique word grouping.

7. The non-transitory computer readable medium of claim 1, wherein the domain comprises one or more of a time interval, a demographic label, a product type, a digital content type, a brand name, a location, or a username.

8. The non-transitory computer readable medium of claim 1, further comprising instructions that, when executed by the at least one processor, cause the computing device to train the word embedding model to generate dynamic vector representations of unique words using an objective function to increase a probability of co-occurrence words.

9. A system comprising:
   one or more memory devices comprising a plurality of digital content items indicating respective times of origin; and
   one or more server devices that are configured to cause the system to:
      generate time interval content clusters for the plurality of digital content items by grouping digital content items whose times of origin are within a threshold period of time;
      determine unique words that occur within the plurality of digital content items;
      generate, for the plurality of digital content items, time interval word groupings corresponding to the time interval content clusters by determining which unique words occur within digital content items of which time interval content clusters include;
      generate, utilizing a word embedding model for a unique word within a time interval word grouping, a dynamic vector representation of the unique word comprising a time embedding of the time interval word grouping;
      receive, from a client device, a query comprising one or more query terms; and
      generate, for display on the client device, a result for the query by comparing the dynamic vector representation of the unique word with the one or more query terms.

10. The system of claim 9, wherein the one or more server devices are configured to further cause the system to determine similarity scores between the one or more query terms and the dynamic vector representation of the unique word by:
   generating vector representations for the one or more query terms; and
   determining distances between the vector representations of the one or more query terms and the dynamic vector representation of the unique word in a vector space.

11. The system of claim 10, wherein the one or more server devices are configured to cause the system to generate the result for the query by identifying, based on the similarity scores, a digital content item from a time interval content cluster that corresponds to the one or more query terms.

12. The system of claim 9, wherein the one or more server devices are configured to cause the system to concatenate, to the unique word, a numerical representation of a time interval associated with the time interval word grouping of the unique word.

13. The system of claim 12, wherein the one or more server devices are configured to cause the system to generate the dynamic vector representation of the unique word by utilizing a character n-gram model to:
   encode the unique word into character grams; and
   concatenate an indication of the time interval to the character grams; and
   generate the dynamic vector representation of the unique word by generating vector representations of the character grams combined with the indication of the time interval.

14. The system of claim 9, wherein the one or more server devices are further configured to cause the system to:
   receive, from the client device, an indication of a time interval over which to generate the result; and
   generate the result for the query by identifying a digital content item from a time interval content cluster corresponding to the indication of the time interval over which to generate the result.

15. The system of claim 9, wherein the one or more server devices are configured to further cause the system to train the word embedding model to generate dynamic vector representations of unique words using an objective function to increase a probability of co-occurrence words and decrease a probability of non-co-occurrence words based on training data.

16. A computer-implemented method for generating dynamic word embeddings indicating domain-specific word meanings, the computer-implemented method comprising:
   identifying a plurality of digital content items comprising domain information;
   performing a step for generating a dynamic vector representation of a unique word occurring within the plurality of digital content items, the dynamic vector representation indicating a domain associated with the unique word based on the domain information of the plurality of digital content items;
   receiving, from a client device, a query comprising one or more query terms; and
   generating, for display on the client device, a result for the query based on comparing the dynamic vector representation of the unique word with the one or more query terms.

17. The computer-implement method of claim 16, further comprising determining similarity scores between the unique word and the one or more query terms based on the dynamic vector representation.

18. The computer-implemented method of claim 17, further comprising:
   receiving, from the client device, an indication of a domain from which to generate the result; and
   wherein generating the result comprises identifying one or more digital content items from the indicated domain based on the similarity scores.

19. The computer-implemented method of claim 17, further comprising:

determining additional similarity scores between a second unique word associated with a second domain and the one or more query terms; and wherein generating the result comprises comparing the similarity scores and the additional similarity scores to identify one or more digital content items that correspond to higher similarity scores.

20. The computer-implemented method of claim 16, wherein the domain comprises one or more of a time interval, a demographic label, a product type, a digital content type, a brand name, a location, or a username.

\* \* \* \* \*